(12) United States Patent
Kokeguchi et al.

(10) Patent No.: US 8,064,119 B2
(45) Date of Patent: Nov. 22, 2011

(54) DISPLAY ELEMENT AND DRIVING METHOD THEREOF

(75) Inventors: Noriyuki Kokeguchi, Kokubunji (JP); Takeshi Hakii, Sagamihara (JP); Osamu Ishige, Kawasaki (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 12/448,884

(22) PCT Filed: Nov. 14, 2007

(86) PCT No.: PCT/JP2007/072091
§ 371 (c)(1),
(2), (4) Date: Jul. 13, 2009

(87) PCT Pub. No.: WO2008/087790
PCT Pub. Date: Jul. 24, 2008

(65) Prior Publication Data
US 2010/0091352 A1 Apr. 15, 2010

(30) Foreign Application Priority Data

Jan. 17, 2007 (JP) ................... 2007-007821
Mar. 14, 2007 (JP) ................... 2007-064695
Mar. 16, 2007 (JP) ................... 2007-068247
Jun. 29, 2007 (JP) ................... 2007-171923

(51) Int. Cl.
*G02F 1/153* (2006.01)
*G02F 1/15* (2006.01)
*G09G 3/19* (2006.01)

(52) U.S. Cl. .............. 359/268; 359/265; 345/49

(58) Field of Classification Search .......... 359/265–277, 359/245–247, 254, 242; 345/49, 105; 250/70; 438/929
See application file for complete search history.

(56) References Cited

U.S. PATENT DOCUMENTS

| 7,336,410 B2* | 2/2008 | Hirota et al. | 359/271 |
| 7,518,777 B2* | 4/2009 | Kokeguchi | 359/270 |
| 7,619,803 B2* | 11/2009 | Kokeguchi et al. | 359/265 |
| 2004/0252099 A1* | 12/2004 | Walder et al. | 345/105 |

FOREIGN PATENT DOCUMENTS

| JP | 7-270831 A | 10/1995 |
| JP | 2003-241227 A | 8/2003 |
| JP | 2003-270670 A | 9/2003 |
| WO | WO2006/129420 | * 4/2006 |
| WO | WO 2006/129424 A1 | 12/2006 |

* cited by examiner

*Primary Examiner* — Dawayne Pinkney
(74) *Attorney, Agent, or Firm* — Holtz, Holtz, Goodman & Chick, PC

(57) ABSTRACT

This invention provides a novel electrochemical display element, which can realize bright white display, high-contrast black and white display, and full-color display by a simple member construction, and a method for driving the display element. The display element is characterized in that it comprises opposed electrodes, and an electrolyte, an electrochromic compound, a metal salt compound, and a white scattering material between the opposed electrodes, and multicolor display of three or more colors is carried out by black display, white display, and display of color other than black by driving the opposed electrodes by taking advantage of 1) a color change as a result of oxidation and reduction reactions of the electrochromic compound, and 2) a color change as a result of reduction precipitation and oxidation dissolution of a metallic element contained in the metal salt compound in at least one of the opposed electrodes.

23 Claims, 3 Drawing Sheets

DISPLAY ELEMENT AND DRIVING METHOD THEREOF

This application is the United States national phase application of International Application PCT/JP2007/072091 filed Nov. 14, 2007.

TECHNICAL FIELD

The present invention relates to a novel electrochemical display element which enables multicolor display with a one-layer structure of the display element, and a driving method thereof.

BACKGROUND OF THE INVENTION

In recent years, along with the increase in the operating speed of personal computers, the spread of network infrastructure, the markedly increased capacity of data storage, and the decrease in price, a further opportunity is increasing in which information such as text and images which have traditionally been supplied in the form of paper printed matter is now acquired and read as convenient electronic information.

Employed as such electronic information reading means are conventional liquid crystal displays as well as CRTs, and in recent years, emissive displays such as organic EL displays are drawn attention. Particularly, when electronic information is in the form of text, it is necessary for an operator to watch the browsing means for a relatively long period of time, which is not a human-conscious operation. Generally, it is known that emissive displays exhibit the following disadvantages: screen flickering results in eye fatigue; display devices are not portable; reading posture is limited; operators tend to gaze at a still screen; and reading over an extended period of time results in an increase of electric power consumption.

Known as display means to overcome such disadvantages are reflective displays (having a memory effect) which do not consume power for maintaining images since these displays use external light. However, due to the following reasons, it is difficult to mention that sufficient performance has been achieved.

Namely, displays employing polarized plates such as reflective liquid crystals exhibit reflectance as low as approximately 40 percent, resulting in having a problem in displaying white. Further, the production methods employed to prepare constituting members are not simple. Polymer dispersion type liquid crystal displays require relatively high voltage, in addition, since only the difference in the refractive index among organic materials is utilized, the resulting images do not exhibit sufficient contrast. Polymer network type liquid crystal displays result in problems in which a high voltage is required and in order to enhance memory functions, complicated TFE circuits are required. Display elements based on an electrophoretic method necessitate voltage as high as at least 10 V, and durability problems may occur due to coagulation of electrophoretic particles. In order to use one of the above methods for a color display, a method to use a color filter or a method to used a pattern color have been known. In the former method, it is difficult to obtain a bright white display, in principal, due to the coloration of the color filter, and the latter method has a problem in that a dark black color cannot be obtained due to the use of a patter color.

As one of the methods which enable a full color display, an electrochromic method has been know, which can be driven with a voltage of 3V or less. When a display exhibiting a bright white color, a high white-black contrast and a color display is prepared using an electrochromic method, it is necessary to laminate three layers each exhibiting a different color, resulting in a high cost due to the complicated element constitution. A full color electrochromic display having a flat color mixing structure has been known (for example, refer to Patent document 1). In this method, no fully sufficient white-black contrast has been obtained, since a dark black color cannot been obtained due to the flat color mixing structure. Also, a method to use a poly pyridine compound in an electrochromic display has been known (for example, refer to Patent document 2), however, in this method, only two colors can be displayed and, specifically, a black display cannot be obtained.

As a method which enables black display, an electro deposition method (hereafter, referred to merely as an ED method) has been known, in which dissolution-deposition of a metal or a metal salt is used for the display (for example, refer to Patent document 3). An ED method is an excellent method to obtain a sufficient white-black contrast, however, color filters of B, G and R, or Y, M and C are needed in order to display a full color, whereby the excellent white-black contrast has not been fully utilized.

Patent documents 1 Japanese Patent Application Publication Open to Public Inspection (hereafter referred to as JP-A) No. 2003-270670

Patent documents 2 Japanese patent No. 2930860

Patent documents 3 JP-A No. 2003-241227

DISCLOSURE OF THE INVENTION

Problems to be Solved by the Invention

In view of the above problems, the present invention was completed. An object of the present invention is to provide a novel electrochemical display element exhibiting a bright white color, a high black-white contrast and a full color display with a simple structure of the element member, and a driving method thereof.

Means to Solve the Problems

The above object of the present invention is achieved by the following structures.

1. A display element comprising opposed electrodes having therebetween an electrolyte, an electrochromic compound, a metal salt compound and a white scattering material, wherein
    the display element carries out a multi-color display of three or more colors by carrying out a black display, a white display and a color display other than the black display, wherein
    the multi-color display is carried out by using:
    (1) a color variation caused by an oxidation-reduction reaction of the electrochromic compound; and
    (2) a color variation caused by deposition of a metal element contained in the metal salt compound onto at least one of the opposed electrodes or dissolution of the metal from the at least one of the opposed electrodes,
    the color variations of (1) and (2) being carried out by a driving operation using the opposed electrodes.
2. The display element of Item 1, wherein the metal salt compound is a silver salt compound.
3. The display element of Item 1 or 2, wherein the electrochromic compound is a metal complex coordinated with at least one organic ligand having a carbon-nitrogen double bond as a substructure.

4. The display element of Item 3, wherein the organic ligand is a compound represented by Formula [I]:

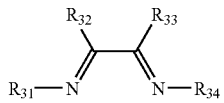

Formula [I]

wherein $R_{31}$, $R_{32}$, $R_{33}$ and $R_{34}$ each independently represent a hydrogen atom, an amino group, a hydroxy group, a mercapto group, an alkoxy group, an alkyl group, an alkenyl group, an alkynyl group, an aryl group or a heterocycle group, these substituents may further have a substituent; $R_{31}$ and $R_{32}$, $R_{32}$ and $R_{33}$, and $R_{33}$ and $R_{34}$ each may be connected with each other to form an aromatic or non-aromatic ring structure; and the ring structure may have a substituent at an arbitrary position of the ring structure.

5. The display element of Item 1 or 2, wherein at least one compound represented by Formula (1) or (2), a metallocene compound and a compound represented by Formula (A) are comprised between the opposed electrodes:

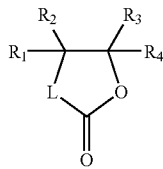

Formula (1)

wherein L represents an oxygen atom or $CH_2$, $R_1$-$R_4$ each represent a hydrogen atom, an alkyl group, an alkenyl group, an aryl group, a cycloalkyl group, an alkoxyalkyl group or an alkoxy group,

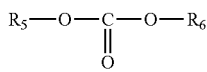

Formula (2)

wherein $R_5$ and $R_6$ each represent a hydrogen atom, an alkyl group, an alkenyl group, an aryl group, a cycloalkyl group, an alkoxyalkyl group or an alkoxy group,

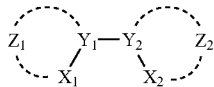

Formula (A)

wherein $X_1$ and $X_2$ each represent —$NR_1$—, —S—, or —O—; $R_1$ represents a hydrogen atom or a bond for forming a double bond with a neighboring atom; $Y_1$ and $Y_2$ each represent $CR_2$ or N; $R_2$ represents a hydrogen atom or a bond for forming a double bond with a neighboring atom; $Z_1$ represents a group of atoms necessary to form a heterocycle with $X_1$, $Y_1$; $Z_2$ represents a group of atoms necessary to form a heterocycle with $X_2$, $Y_2$; a heterocycle formed by $Z_1$, $X_1$ and $Y_1$ and a heterocycle formed by $Z_2$, $X_2$ and $Y_2$ each may have a substituent or may form the condensed ring.

6. The display element of Item 1 or 2 comprising opposed electrodes having therebetween a silver complex and a metal complex other than a silver complex, both complexes having a compound represented by Formula (A) as a common ligand, a white scattering material and an electrolyte comprising a metallocene compound,
wherein
an oxidation-reduction potential of the metallocene compound is higher than a deposition overvoltage of silver.

7. The display element of Item 5 or 6, wherein a metal species forming the metallocene compound is at least one selected from Fe, Co and Ni.

8. The display element of any one of Items 5 to 7, wherein the electrochromic compound is prepared by reacting an organic ligand with the metallocene compound.

9. The display element of any one of Items 1 to 8, wherein the electrochromic compound has an adsorbing group which chemically or physically adsorbs to a surface of at least one of the opposed electrodes.

10. The display element of Item 9, wherein the adsorbing group is at least one selected from —COON, —P=O(OH)$_2$, —OP=O(OH)$_2$ and —Si(OR)$_3$, R representing an alkyl group.

11. The display element of any one of Items 1 to 10, the display element carrying out the color display, the white display and the black display, wherein the color display other than the black display is carried out by arranging display areas displaying different colors in a plane.

12. The display element of any one of Items 1 to 11, wherein the electrochromic compound is supported in a porous metal oxide layer.

13. The display element of Item 12, wherein the electrochromic compound is supported in the porous metal oxide layer by painting separately using an inkjet method.

14. The display element of any one of Items 1 to 13, wherein the display element satisfies the following condition:

$$0 \leq [X]/[Ag] \leq 0.01$$

wherein:
[Ag] (mole/kg) represents a molar content of a compound containing silver; and
[X](mole/kg) represents a total molar content of halogen atoms contained in halogen ions or halogen molecules.

15. The display element of any one of Items 1 to 14, wherein a distance between the opposed electrodes is 20 μm or more but 100 μm or less.

16. The display element of any one of Items 1 to 15, wherein the black display is carried out by a cathodic reaction.

17. The display element of any one of Items 1 to 16, wherein an average diameter of the white scattering material is 200 nm or more.

18. The display element of any one of Items 1 to 17, wherein the white scattering material comprises at least one selected from $TiO_2$, ZnO and $Al_2O_3$.

19. The display element of any one of Items 1 to 18, wherein the electrolyte comprises a cyclic ester compound.

20. The display element of any one of Items 1 to 19, wherein the electrolyte is selected from a solid electrolyte, a gel electrolyte and a high viscosity electrolyte.

21. The display element of any one of Items 1 to 20, wherein an opposed electrode used on an observation side is at least one selected from Indium oxide doped with Sn (ITO, $In_2O_3$:Sn), Tin oxide doped with F (FTO, $SnO_2$:F) and ZnO.

22. A method of driving the display element of any one of Items 1 to 21, wherein a colored state formed by an anodic reaction is erased at a voltage lower than a deposition overvoltage of a cathodic reaction product.

23. A method of driving the display element of any one of Items 1 to 21, wherein a colored state formed by a cathodic reaction is erased at a voltage equal to or lower than a oxidation voltage of an anodic reaction product.

Effect of the Invention

According to the present invention, a novel electrochemical display element exhibiting a bright white color, a high white-black contrast and a full color display with a simple structure of the element member, and a driving method thereof could be obtained.

EXPLANATION OF NUMERALS

Figure 1:
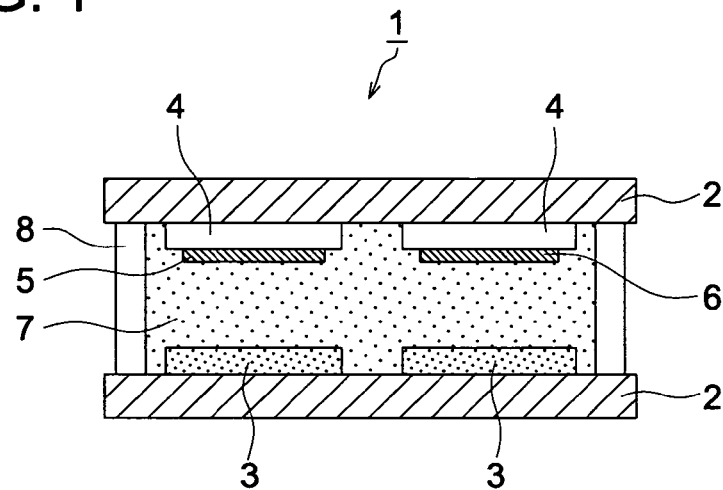
FIG. 1 is a schematic illustration showing one example of the construction of the display element of the present invention.

1 Display Element
2 Substrate
3 Metal Electrode
4 Transparent Electrode
5 and 6 Metal complex section
7 Electrolyte
8 Sealing Material

DESCRIPTION OF THE PREFERRED EMBODIMENTS

Hereafter, the preferred embodiments to carry out the present invention will be explained in detail.

As a result of intense examination on the above problems, it was found that a novel electrochemical display element exhibiting a bright white color, a high white-black contrast and a full color display with a simple structure of the element member, and a driving method thereof could be obtained by a display element comprising opposed electrodes having therebetween an electrolyte, an electrochromic compound, a metal salt compound and a white scattering material, wherein the display element carries out a multi-color display of three or more colors by carrying out a black display, a white display and a color display other than the black display, wherein the multi-color display is carried out by using: 1) a color variation caused by an oxidation-reduction reaction of the electrochromic compound; and 2) a color variation caused by deposition of a metal element contained in the metal salt compound onto at least one of the opposed electrodes or dissolution of the metal from the at least one of the opposed electrodes, the color variations of 1) and 2) being carried out by a driving operation using the opposed electrodes.

Details of the display element of the present invention will be described below.

[Electrolyte]

The "electrolyte" as used in the present invention generally refers to a substance which exhibits ionic conduction when the substance is dissolved in a solvent such as water (hereafter, referred to as "an electrolyte in a narrow sense"), however, in the explanation in the present invention, a mixed substance in which a metal or a compound which may be an electrolyte or a non-electrolyte is contained in an electrolyte in a narrow sense is also referred to as the "electrolyte" (hereafter referred to as an electrolyte in a broad sense).

[Metal Salt Compound]

The metal salt compound of the present invention may be any kind of compound as long as the compound is a metal salt containing a metal species which can be deposited on or dissolved from one of a pair of opposing electrodes by a driving operation between the pair of electrodes. Examples of a preferable metal species include: silver, bismuth, copper, nickel, iron, chromium and zinc. Of these, silver and bismuth are specifically preferable.

[Silver Salt Compound]

The silver salt compound according to the present invention is a general term including silver and a compound containing silver in the chemical structure, for example, a silver oxide, a silver sulfide, metallic silver, silver colloid particles, a silver halide, a silver complex compound, or a silver ion. The state of phase, such as solid state, solubilization state to a liquid, or gaseous state, and charge state such as neutral, anionic or cationic, are not specifically limited.

[Basic Constitution of a Display Device]

In the display element of the present invention, a pair of opposing electrodes are provided in the display portion. On Electrode 1 which is one of the opposing electrodes closer to the display portion, a transparent electrode such as an ITO electrode is provided and on Electrode 2 which is the other electrode, a metal electrode such as a silver electrode is provided. Between Electrodes 1 and 2, an electrolyte containing silver or a compound containing silver in the chemical structure is preserved. By applying voltages of positive polarity and negative polarity between the opposing electrodes, a silver oxidation-reduction reaction and oxidation and reduction of an electrochromic compound are carried out on Electrodes 1 and 2, whereby black display, white display and color display can be conducted employing the difference in color of both compounds at the oxidized state and the reduced state as well as a white scattering material. In the black display, blackened silver which is a reduced state of silver is preferably utilized.

[Electrochromic Compound]

In the display element of the present invention, any compound is usable as an electrochromic compound (hereafter, referred to as an EC compound) as long as the compound exhibits a phenomenon in which the nature of optical absorption (color or optical transmittance) is reversibly changed by means of electrochemical oxidation-reduction (electrochromism). As specific compounds, the compounds described in "Electrochromic Display", p 27-124 (Jun. 28, 1991, published by Sangyo Tosho co., Ltd.) and in "Development of Chromic Material", p 81-95 (Nov. 15, 2000, published by CMC Co., Ltd.) are cited.

In the display element of the present invention, the electrochromic compound is preferably a metal complex coordinated with at least one organic ligand having a carbon-nitrogen double bond as the substructure.

The metal which constitutes the metal complex is not specifically limited as long as the metal can be coordinated with a ligand having a carbon-nitrogen double bond as the substructure, examples of which include group 8 metals of the periodic table (iron, ruthenium and osmium), group 9 metals in the periodic table (cobalt, rhodium and iridium), lanthanoid metals (Dysprosium, ytterbium and lutetium), nickel and copper. Of these, iron and cobalt are preferable.

The metal complex according to the present invention has a feature that the colored state varies according to the oxidation-reduction reaction. The colored state of the metal complex preferably varies in the voltage range of −3.5V to 3.5V and more preferably in the voltage range of −1.5V to 1.5V.

Specific examples of an organic ligand having a carbon-nitrogen double bond as the substructure include: hydrazones (for example, hydrazone, azine, semicarbazone, isosemicarbazone, carbohydrazone, hydrazone acid, hydrazidine and amidrazone), oximes (for example, oxime, hydroximic acid and amidoxime), imines, and nitrogen-containing heterocyclic compounds (for example, pyrazole, imidazole, thiazole, oxazole, triazole, oxydiazole, thiadiazole, pyridine, pyridazine, pyrimidine, pyrazine, triazine, benzimidazole, purine, quinoline, isoquinoline, quinoxaline, phenanthroline, porphyrin, phthalocyanine, pyrroline, imidazoline, pyrazoline, pyrazolone, oxazoline and thiazoline).

Among these organic ligands, a polydentate ligand, specifically, a bidentate ligand or a tridentate ligand is preferable, specific examples of which include: bipyridines, terpyridines, phenanthrolines, tetrazolyl-pyridines, pyridyl-quinazolines, bis-isoquinolines, pyridyl-azines and pyridyl-benzimidazoles.

(Compound Represented by Formula [I])

Further, the organic ligand having a carbon-nitrogen double bond as the substructure is preferably represented by abovementioned Formula [I].

In the abovementioned Formula [I], $R_{31}$, $R_{32}$, $R_{33}$ and $R_{34}$ each independently represent a hydrogen atom, an amino group, a hydroxy group, a mercapto group, an alkoxy group, an alkyl group, an alkenyl group, an alkynyl group, an aryl group or a heterocycle group, and these substituents may further have a substituent. Further, $R_{31}$ and $R_{32}$, $R_{32}$ and $R_{33}$, and $R_{33}$ and $R_{34}$ each may be connected with each other to form an aromatic or non-aromatic ring structure, and each ring structure may have a substituent at an arbitrary position of the ring structure.

Preferable is a compound in which $R_{31}$ and $R_{32}$, $R_{32}$ and $R_{33}$, and $R_{33}$ and $R_{34}$ each are connected with each other to form an aromatic or non-aromatic ring structure.

When $R_{31}$ and $R_{32}$, are connected with each other to form a ring structure, the organic ligand having a carbon-nitrogen double bond as the substructure is preferably represented by following Formula [II].

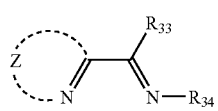

Formula [II]

In above Formula (II), $R_{33}$ and $R_{34}$ each have the same meaning as those in Formula [I], and Z represents a group of atoms necessary to form a ring structure together with C=N. These ring structures may have a substituent at an arbitrary substitutable position of the ring structure. These ring structures preferably are heteroaromatic ring structures.

Specific examples of the moiety of a ring structure from which substituent is omitted will be shown below, however, the present invention is not limited thereto.

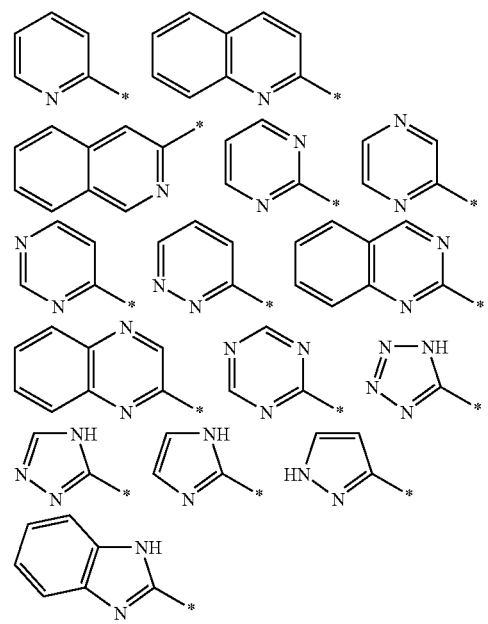

When $R_{31}$ and $R_{32}$, and $R_{33}$ and $R_{34}$, each are connected with each other to form a ring structure, the organic ligand according to the present invention having a carbon-nitrogen double bond as the substructure is preferably represented by following Formula [III].

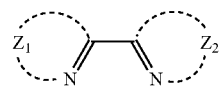

Formula [III]

In above Formula (III), $Z_1$ and $Z_2$ each represent a group of atoms necessary to form a ring structure together with C=N. The ring structures of the compound represented by Formula [III] may have a substituent at an arbitrary substitutable position of the ring structures. The substituent is not specifically limited and may be a substituent listed above as specific ring structures.

Further, when $R_{32}$ and $R_{33}$ are connected with each other to form a ring structure, the organic ligand according to the present invention having a carbon-nitrogen double bond as the substructure is preferably represented by following Formula [IV].

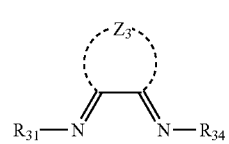

Formula [IV]

In above Formula (IV), $R_{31}$ and $R_{34}$ each have the same meaning as those in Formula [I], and $Z_3$ represents a group of atoms necessary to form a ring structure together with the two carbon atoms. The ring structure may have a substituent at an arbitrary substitutable position.

Among Formulas [I] through [IV], specifically preferable are following Formulas [V] and [VI].

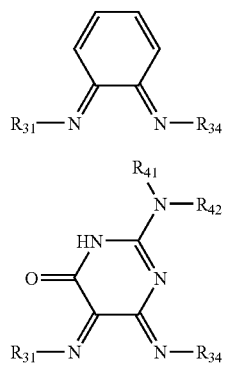

Formula [V]

Formula [VI]

In above Formula (V), $R_{31}$ and $R_{34}$ each have the same meaning as those in Formula [I]. $R_{41}$ and $R_{42}$ each represent an alkyl group which may have a substituent.

In view of the adhesion with the electrode surface and the durability of the film, the organic ligand according to the present invention having a carbon-nitrogen double bond as the substructure preferably has at least one adsorbing group which chemically or physically adsorbs to the electrode.

The chemical adsorption according to the present invention is a comparatively strong adsorbed state via a chemical bond with an electrode surface, and the physical adsorption according to the present invention is a comparatively weak adsorbed state via the van der Waals force committed between an electrode surface and adsorbate.

The adsorbing group according to the present invention is preferably a chemically adsorbing group. Examples of a chemically adsorbing group include: —COOH, —P═O(OH)$_2$, —OP═O(OH)$_2$ and —Si(OR)$_3$ (R represents an alkyl group).

Specific examples of an organic ligand having a carbon-nitrogen double bond as the substructure according to the present invention and an organic ligand having further an adsorbing group which chemically or physically adsorbs to an electrode surface will be shown below, however, the present invention is not limited thereto.

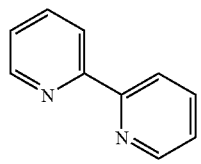

(1-1)

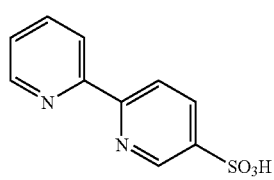

(1-2)

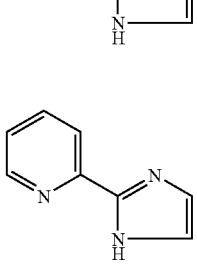

(1-3)

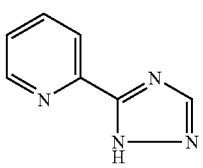

(1-4)

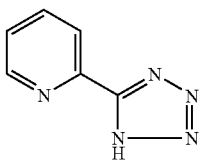

(1-5)

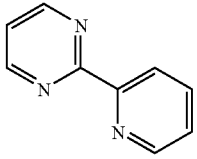

(1-6)

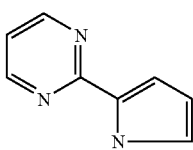

(1-7)

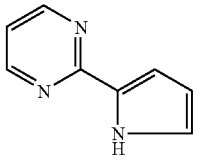

(1-8)

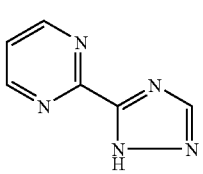

(1-9)

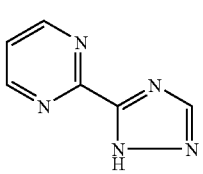

(1-10)

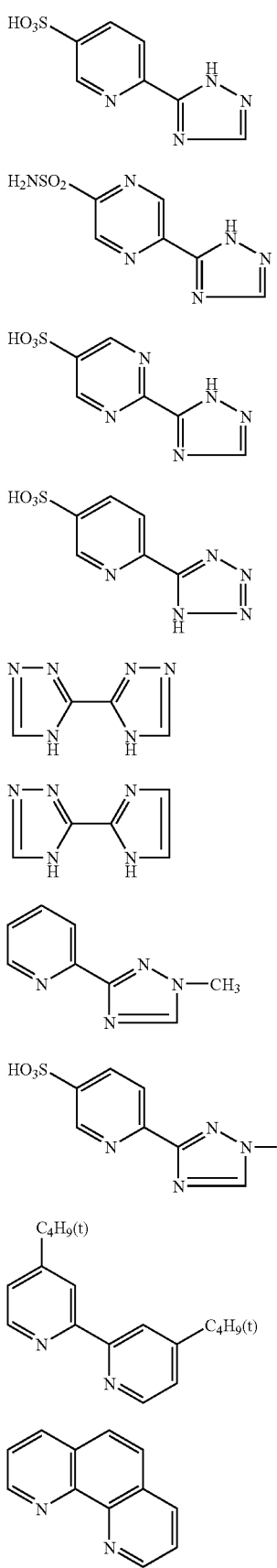
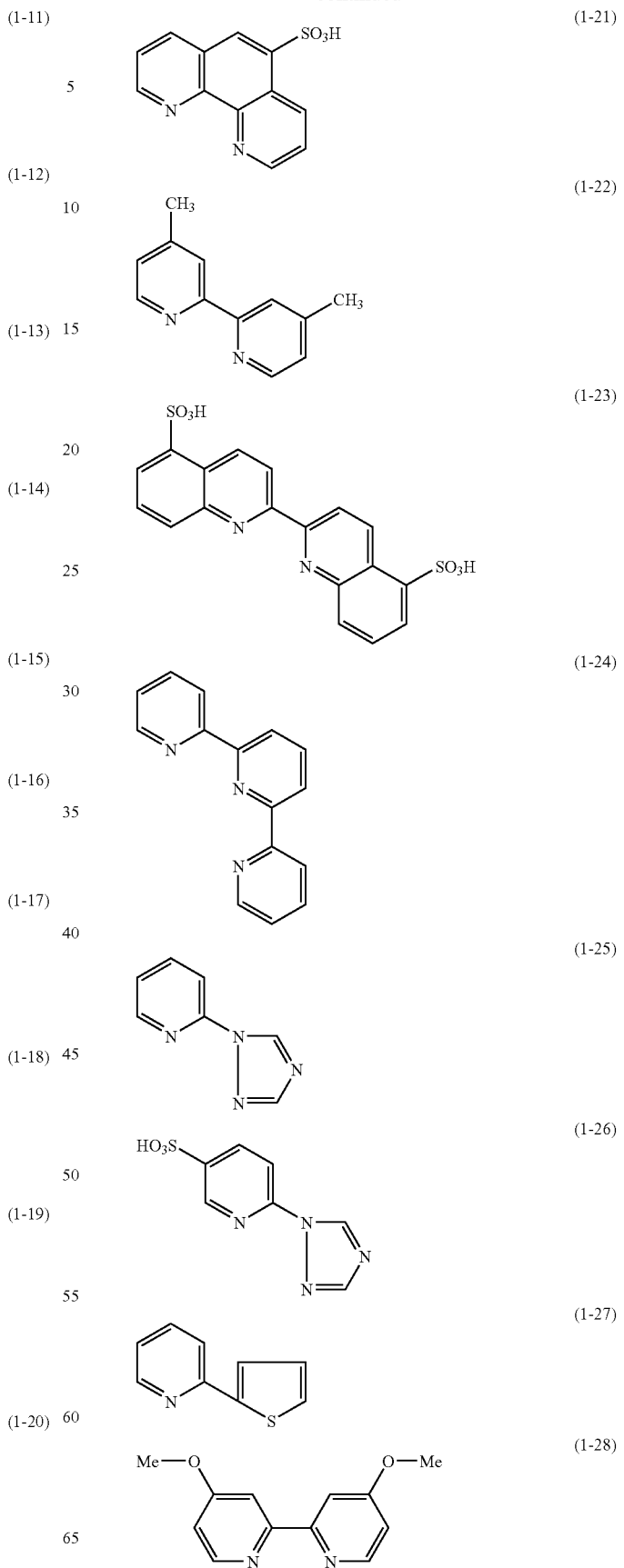

-continued
(1-29)
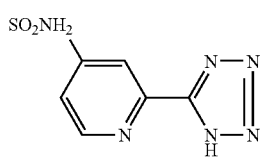
(1-30)
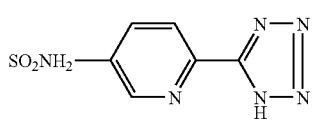
(1-31)
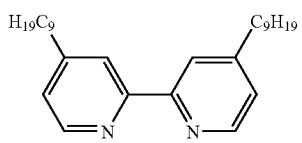
(1-32)
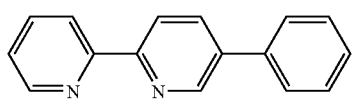
(1-33)
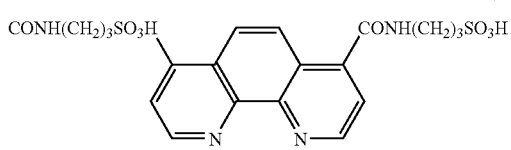
(1-34)
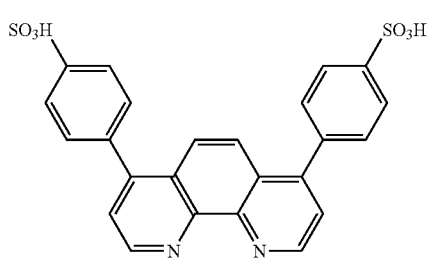
(1-35)
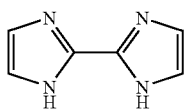
(1-36)
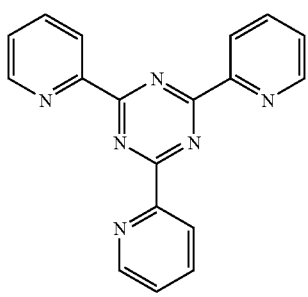
(1-37)
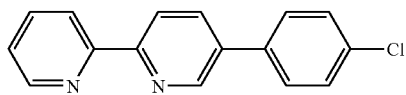
-continued
(1-38)
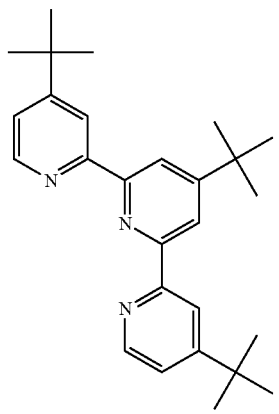
(1-39)
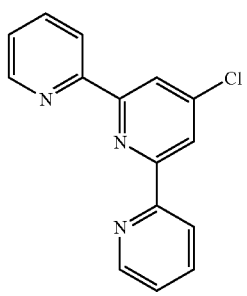
(1-40)
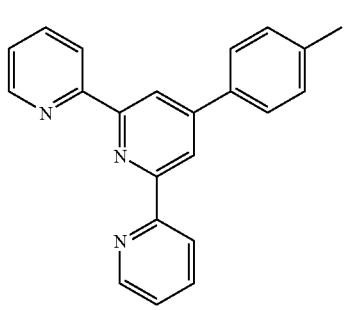
(1-41)
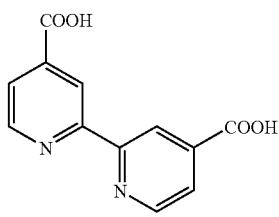
(1-42)
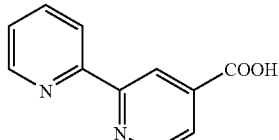
(1-43)
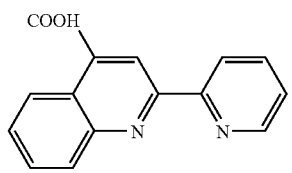

(1-44)
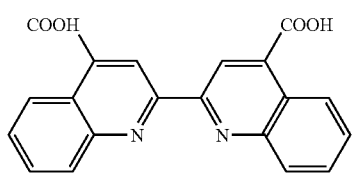
(1-45)
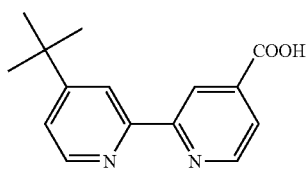
(1-46)
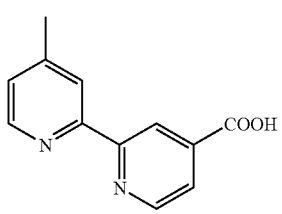
(1-47)
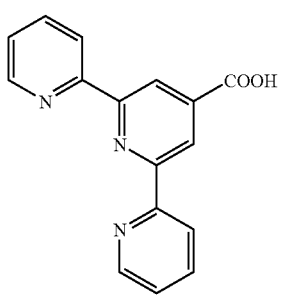
(1-48)
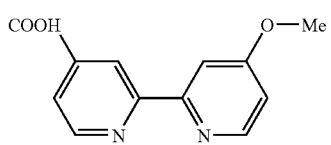
(1-49)
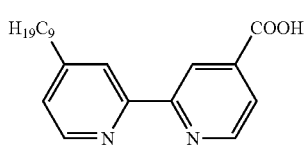
(1-50)
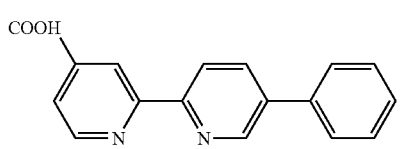
(1-51)
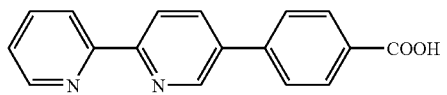
(1-52)
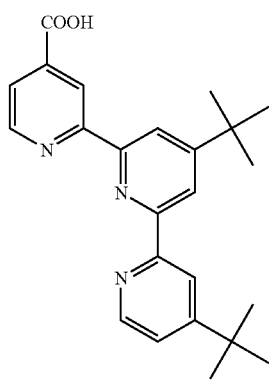
(1-53)
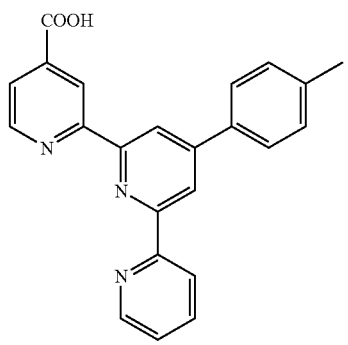
(1-54)
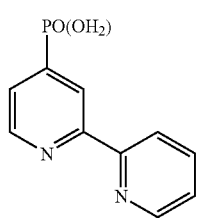
(1-55)
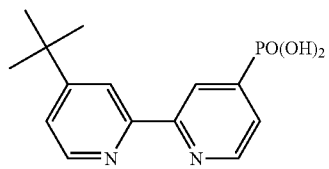
(1-56)

(1-57) (1-58) (1-59) (1-60) (1-61) (1-62) (1-63) (1-64) (1-65) (1-66) (1-67) (1-68)

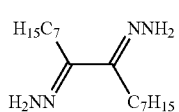 (1-69)
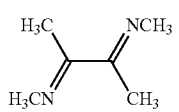 (1-70)
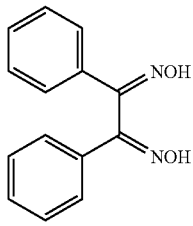 (1-71)
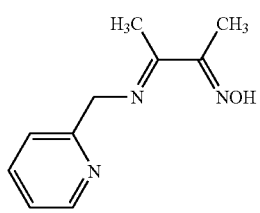 (1-72)
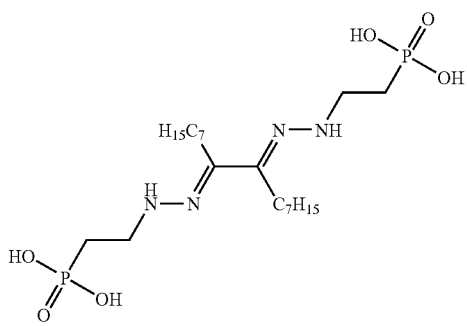 (1-73)
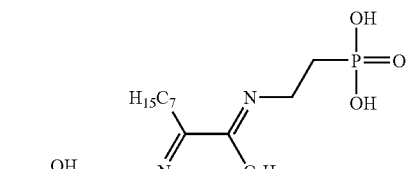 (1-74)
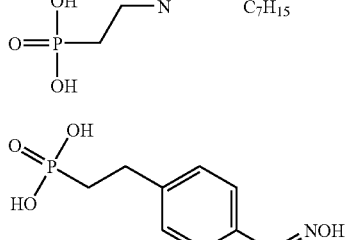 (1-75)
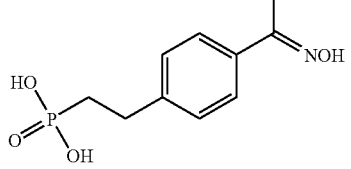 
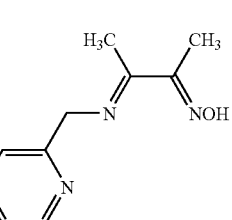 (1-76)
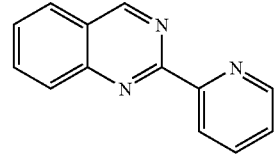 (1-77)
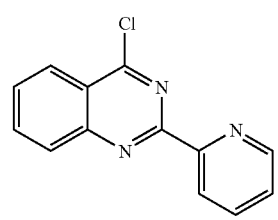 (1-78)
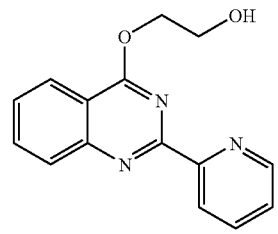 (1-79)
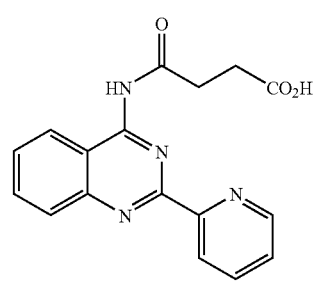 (1-80)
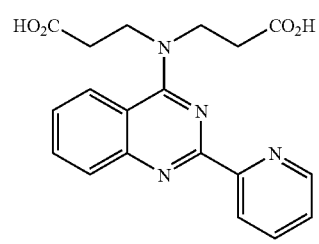 (1-81)
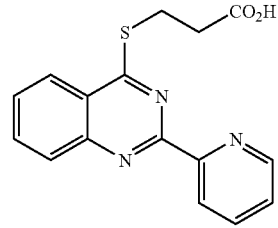 (1-82)

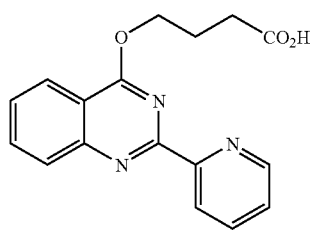
(1-83)
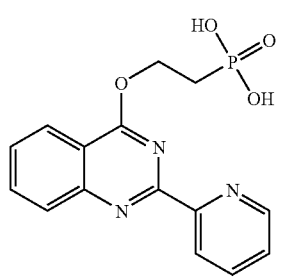
(1-84)
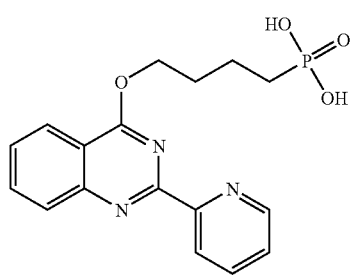
(1-85)
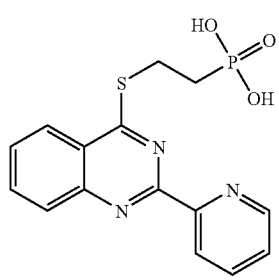
(1-86)
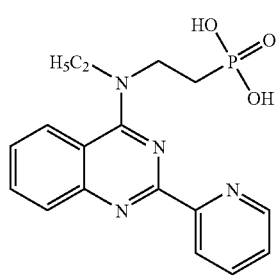
(1-87)
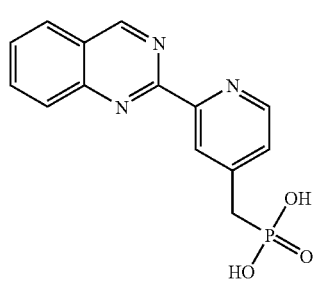
(1-88)
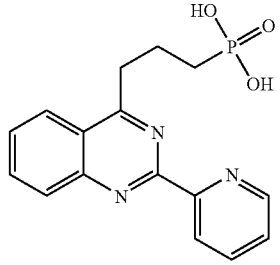
(1-89)
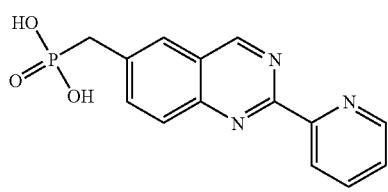
(1-90)
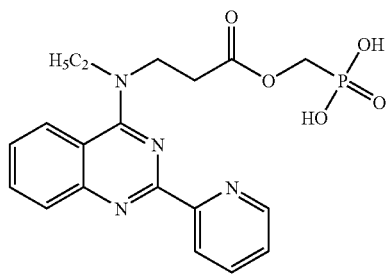
(1-91)
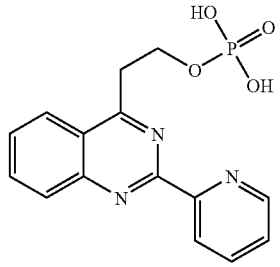
(1-92)
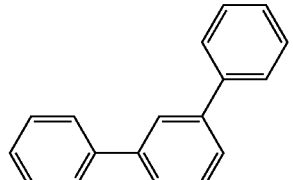
(1-93)
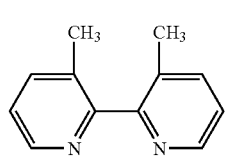
(1-94)
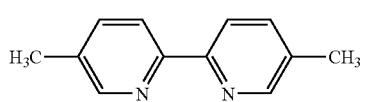
(1-95)

(1-96)
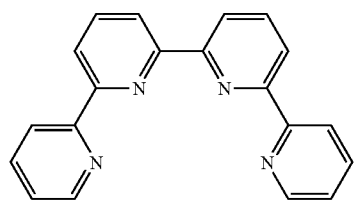
(1-97)
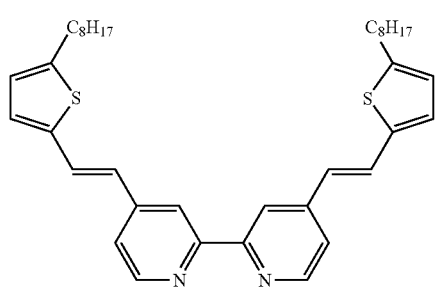
(1-98)
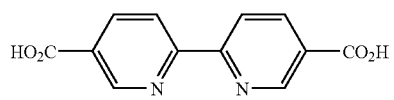
(1-99)
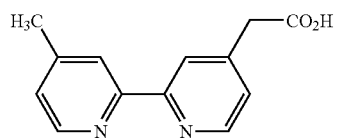
(1-100)
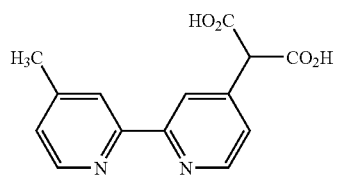
(1-101)
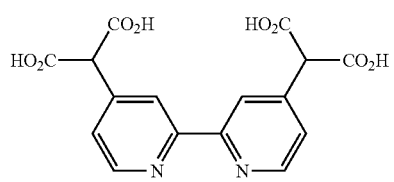
(1-102)
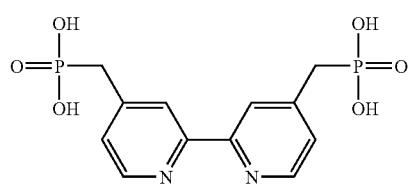
(1-103)
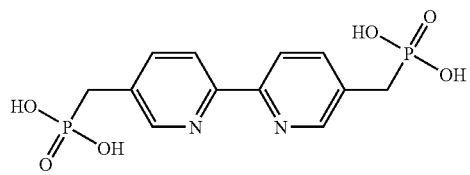
(1-104)
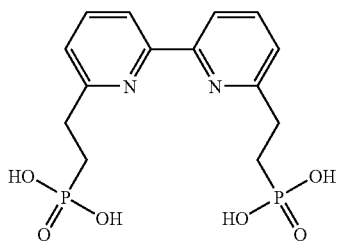
(1-105)
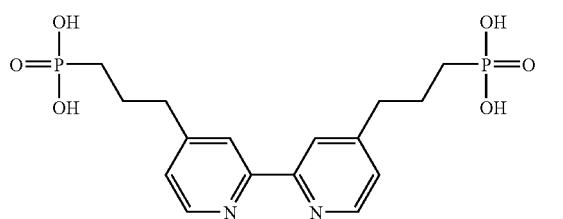
(1-106)
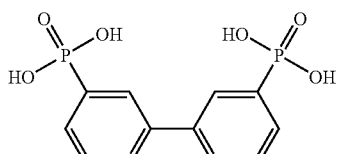
(1-107)
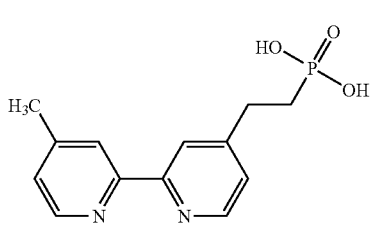
(1-108)
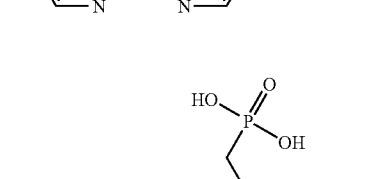
(1-109)
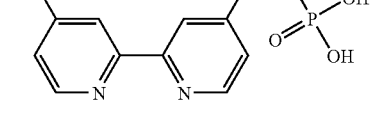
(1-110)
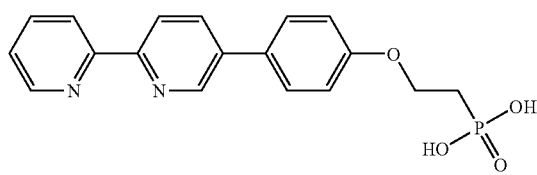

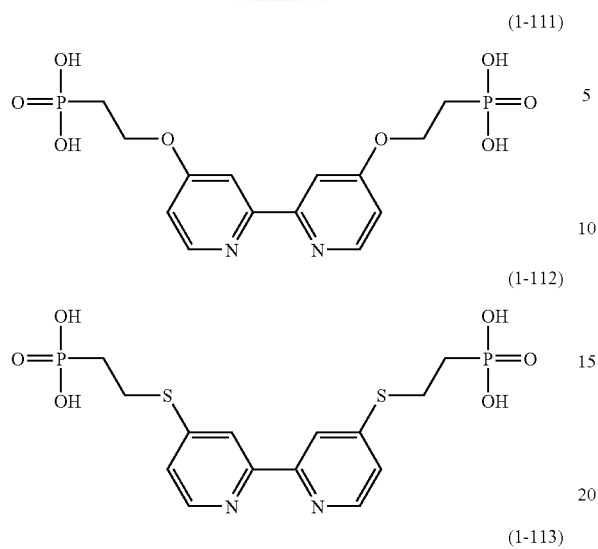
(1-111)
(1-112)
(1-113)
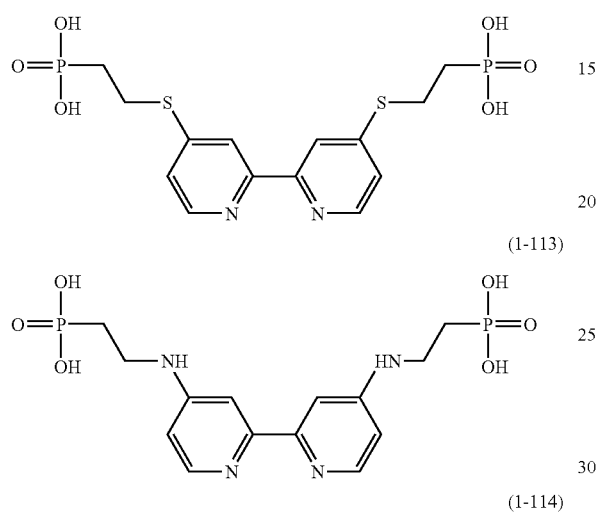
(1-114)
(1-115)
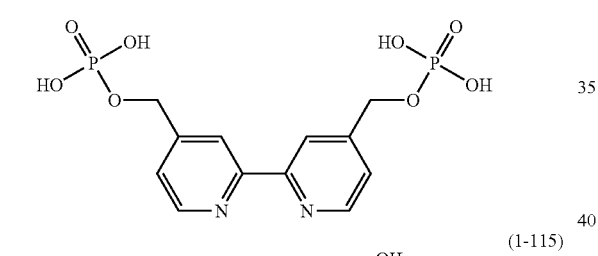
(1-116)
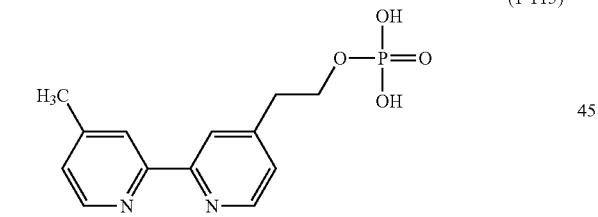
(1-117)
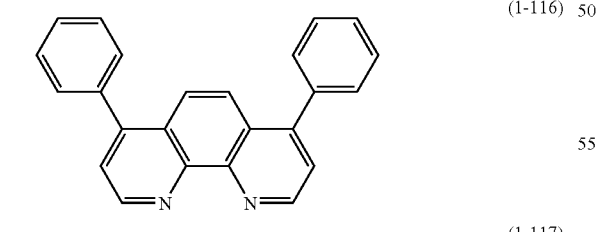
(1-118)
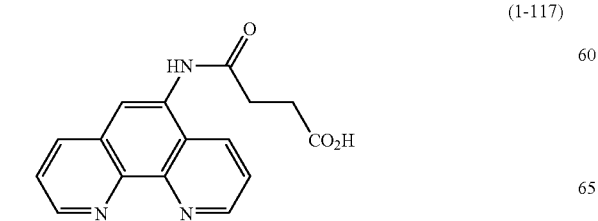
(1-119)
(1-120)
(1-121)
(1-122)

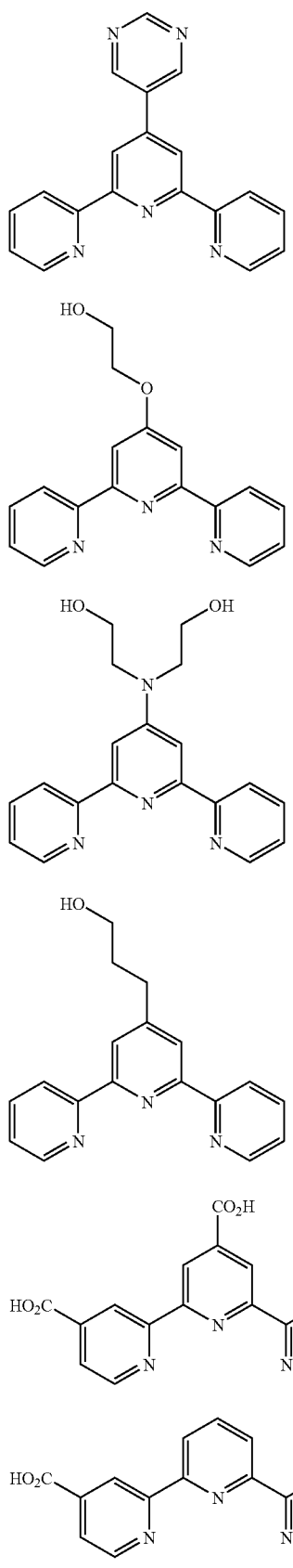
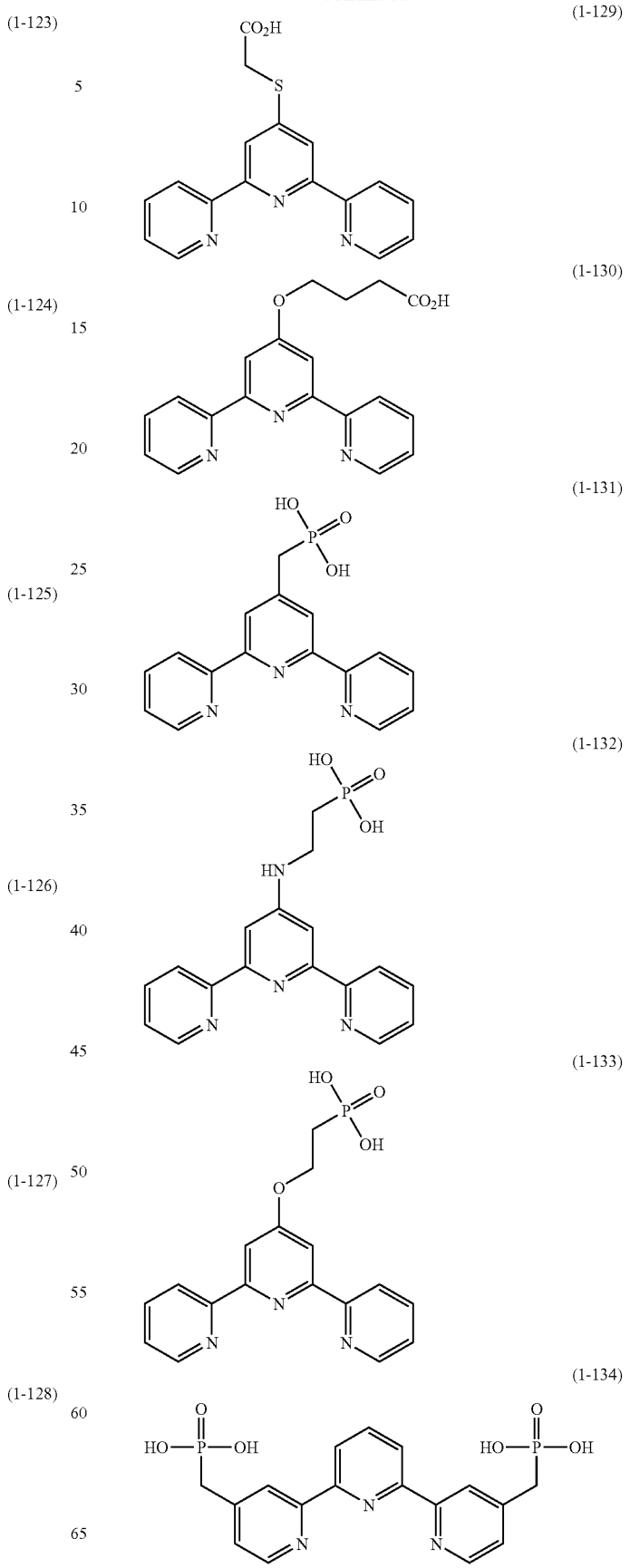

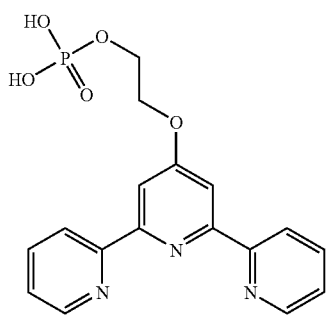
(1-135)
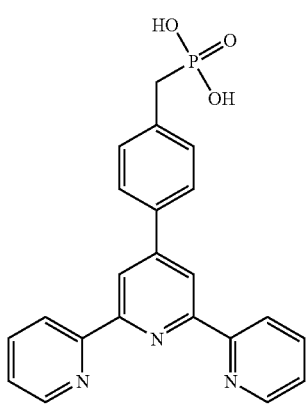
(1-136)
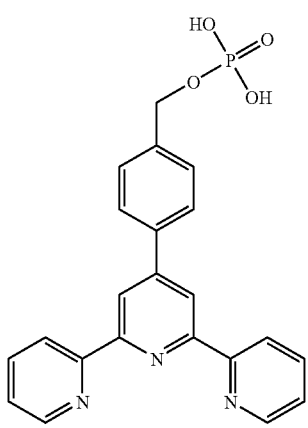
(1-137)
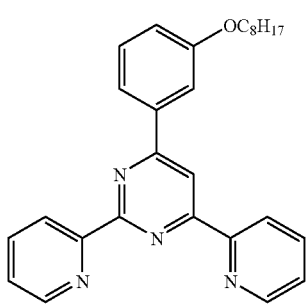
(1-138)
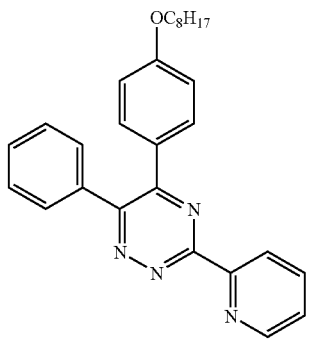
(1-139)
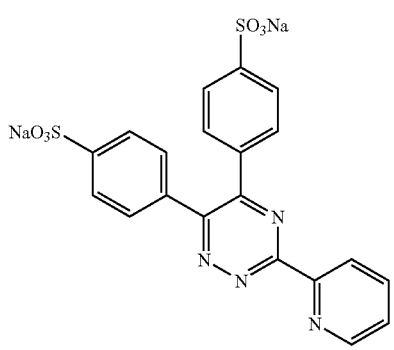
(1-140)
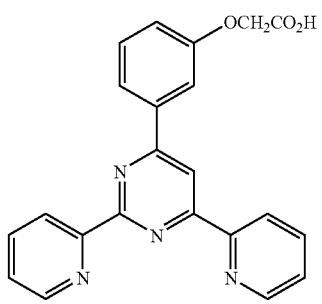
(1-141)
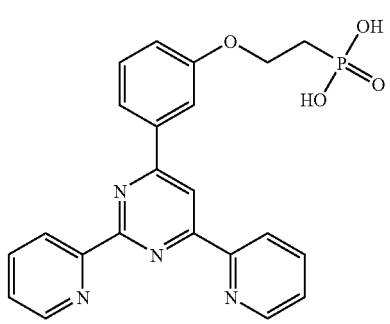
(1-142)
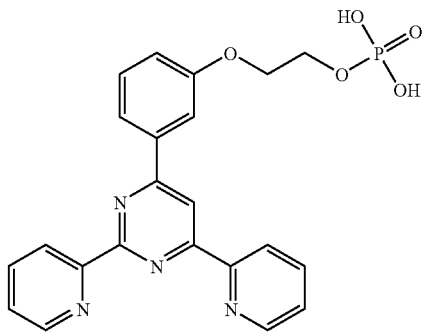
(1-143)

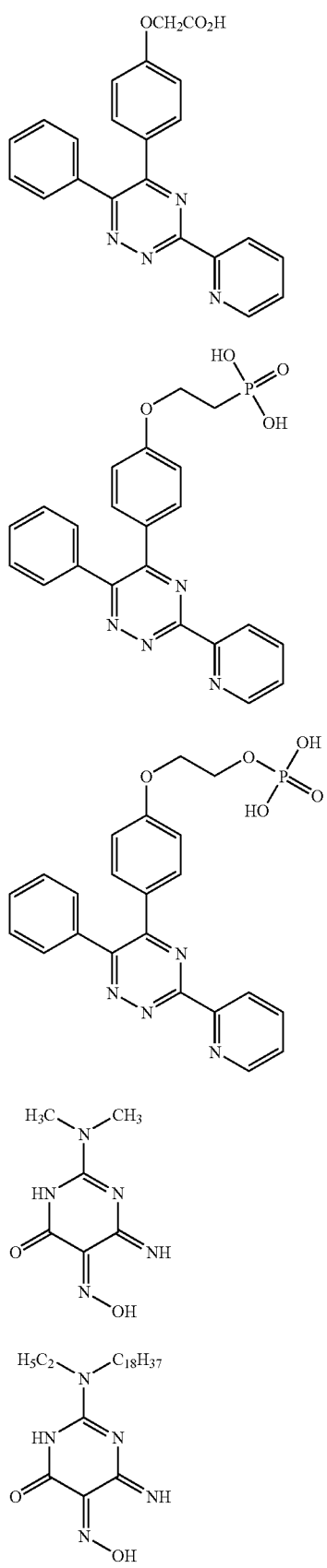
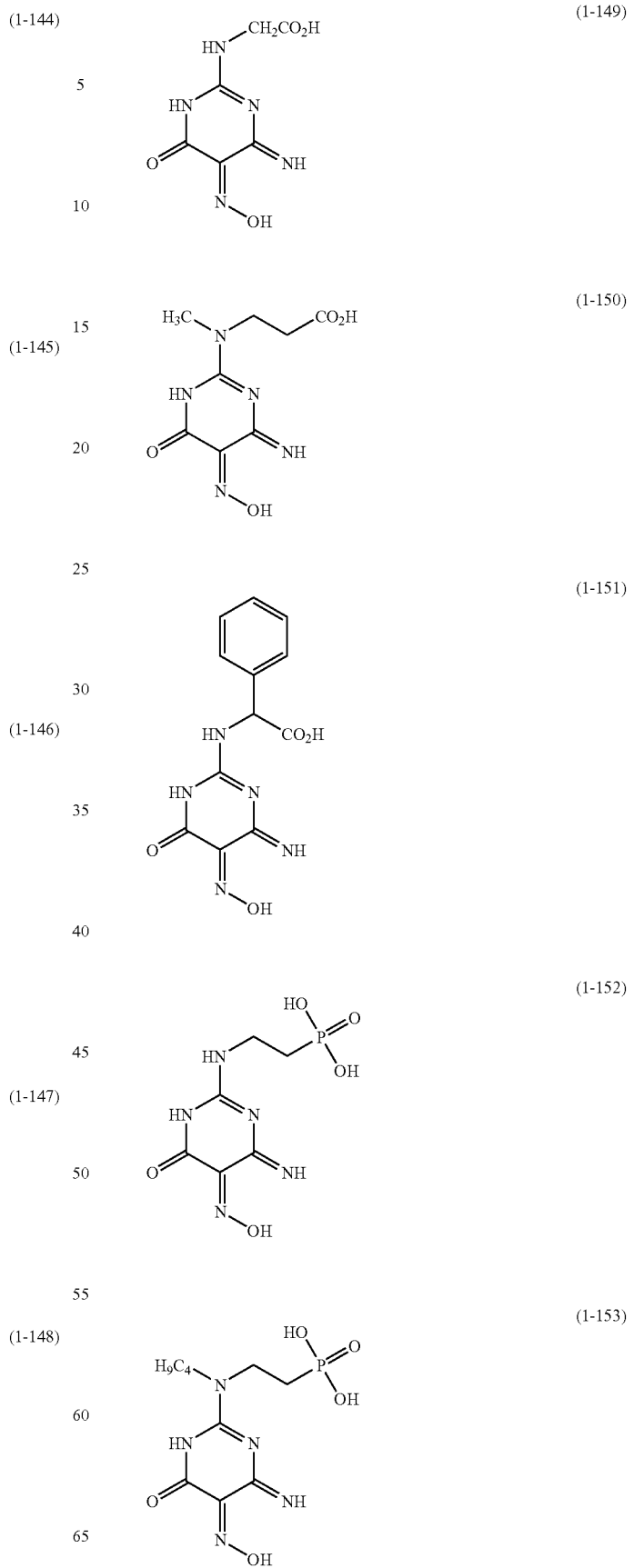

-continued
(1-154)
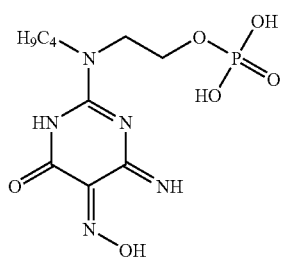
(1-155)
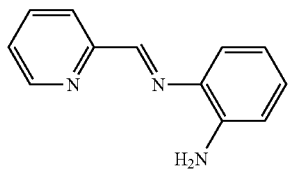
(1-156)
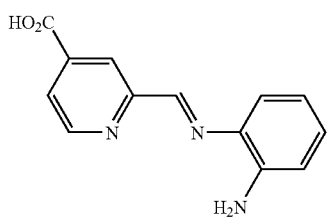
(1-157)
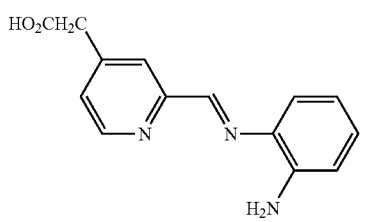
(1-158)
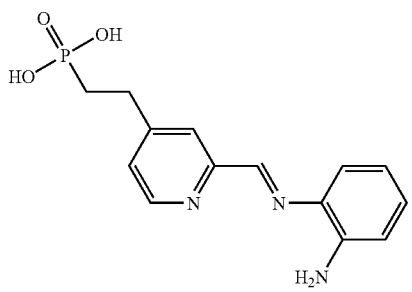
(1-159)
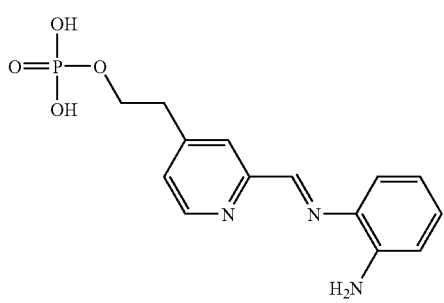
-continued
(1-160)
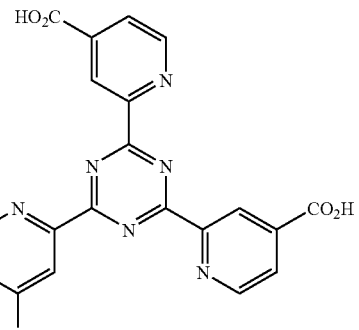
(1-161)
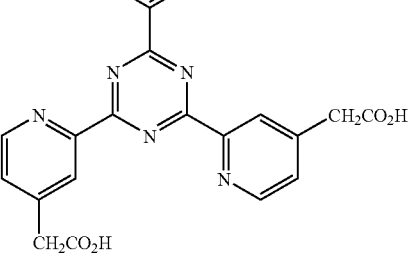
(1-162)
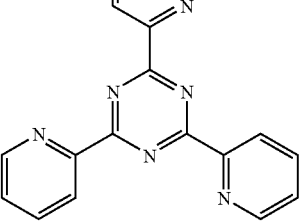
(1-163)
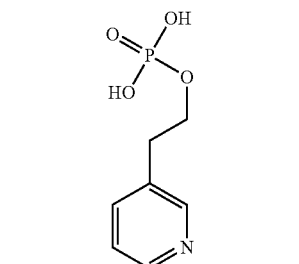

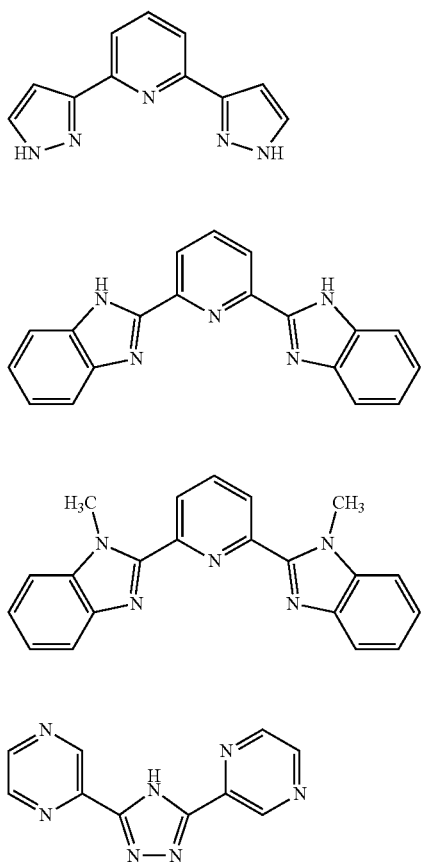

(1-164)
(1-165)
(1-166)
(1-167)
(1-168)
(1-169)
(1-170)

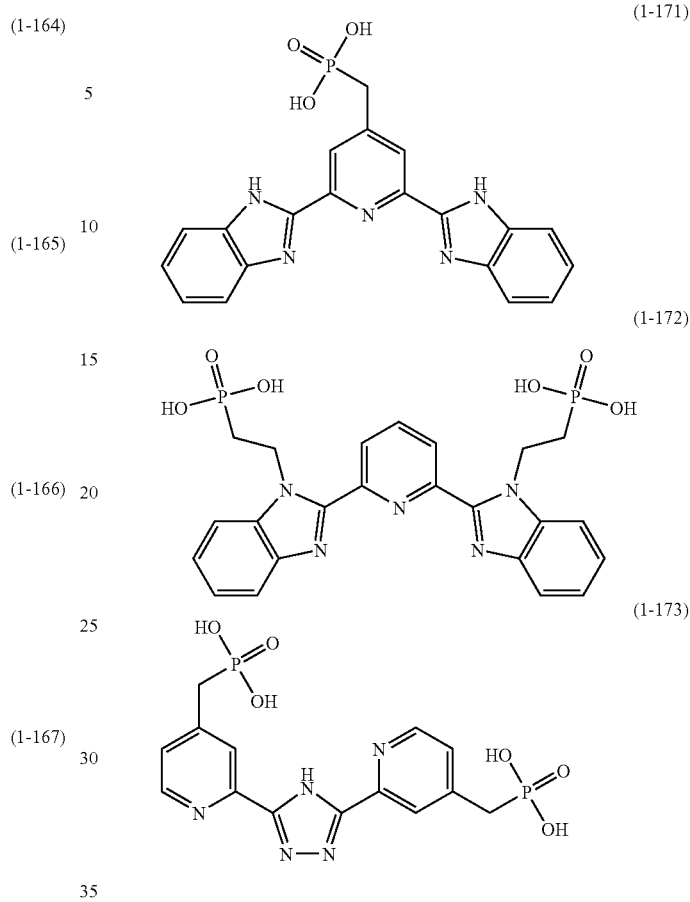

(1-171)
(1-172)
(1-173)

Next, examples of a metal complex coordinated with at least one organic ligand having a carbon-nitrogen double bond as the substructure will be shown below, however, the present invention is not limited thereto. In the table, M represents a center metal, L represents an organic ligand, n represents a number of the ligand and A represents a counter salt neutralizing the charge.

| Metal Complex No. | M | L (Excemplified No.) | n | A |
|---|---|---|---|---|
| A-1 | Fe (II) | 1-147 | 3 | (ClO$_4$)$_2$ |
| A-2 | Fe (II) | 1-152 | 3 | (PF$_6$)$_2$ |
| A-3 | Fe (II) | 1-158 | 2 | (PF$_6$)$_2$ |
| A-4 | Fe (II) | 1-70 | 3 | I$_2$ |
| A-5 | Fe (II) | 1-37 | 3 | (ClO$_4$)$_2$ |
| A-6 | Fe (II) | 1-102 | 3 | (PF$_6$)$_2$ |
| A-7 | Fe (II) | 1-116 | 3 | SO$_4$ |
| A-8 | Fe (II) | 1-119 | 3 | SO$_4$ |
| A-9 | Fe (II) | 1-24 | 2 | (PF$_6$)$_2$ |
| A-10 | Fe (II) | 1-131 | 2 | (PF$_6$)$_2$ |
| A-11 | Fe (II) | 1-146 | 3 | (BF$_4$)$_2$ |
| A-12 | Ru (II) | 1-1 | 3 | Cl$_2$ |
| A-13 | Ru (II) | 1-94 | 3 | (PF$_6$)$_2$ |
| A-14 | Co (II) | 1-41 | 3 | (ClO$_4$)$_2$ |
| A-15 | Ni (II) | 1-20 | 3 | (ClO$_4$)$_2$ |

(Metallocene Compound)

The electrochromic compound according to the present invention is preferably prepared by reacting the organic ligand having a carbon-nitrogen double bond as the substructure with a metallocene compound.

As a metallocene compound usable in the present invention, a metallocene derivative may be used. It is preferable to use a ferrocene derivative as the metallocene derivative. Examples of a ferrocene derivative include: ferrocene, methyl ferrocene, dimethyl ferrocene, ethyl ferrocene, propyl ferrocene, n-butyl ferrocene, t-butyl ferrocene and 1-1-dicarboxy ferrocene. The metallocene derivatives each may be used alone or in combination of two or more kinds.

By preparing a metallocene compound, a silver compound, and an organic ligand at the time of electrolyte preparation, the metal complex of the metal of the metallocene compound and organic ligand can be produced in-Situ in an electrolyte.

(Compound Represented with a General Formula (A))

In the display element of the present invention, it is preferable that at least one of a compound represented by Formula (1) or (2), a metallocene compound and a compound represented by Formula (A) are contained between the opposing electrodes.

Further, in the display element of the present invention, it is preferable that a silver complex and a metal complex other than a silver complex, both complexes having a common ligand containing a compound represented by Formula (A), a white scattering material and a metallocene compound are contained between the opposing electrodes, and that the oxidation-reduction potential of the metallocene compound is more noble than the deposition overvoltage of silver.

The compound represented by Formula (A) of the present invention will be explained below.

In aforementioned Formula (A), $X_1$ and $X_2$ each represent —$NR_1$—, —S—, or —O—. $R_1$ represents a hydrogen atom or a bond for forming a double bond with a neighboring atom. $Y_1$ and $Y_2$ each represent $CR_2$ or N. $R_2$ represents a hydrogen atom or a bond for forming a double bond with a neighboring atom. $Z_1$ and $Z_2$ each represent a group of atoms necessary to form a heterocycle with $X_1$, $Y_1$ and $X_2$, $Y_2$, respectively. The heterocycles formed by $X_i$, $Y_1$, $Z_1$ and $X_2$, $Y_2$, $Z_2$ each may have a substituent or may form the condensed ring. Further, such heterocycles may form one condensed ring as a whole through other hydrocarbon ring or heterocycle. The number of atomic group which constitutes the heterocycle is not specifically limited, however, a 5-membered ring or a 6-membered ring is preferable.

Among the aforementioned nitrogen-containing heterocycles, preferable are, for example, a pyridine ring, a pyrazine ring, a pyrimidine ring, a triazine ring, a quinoline ring, an isoquinoline ring, a pyrrole ring, an imidazole ring, a pyrazole ring, a triazole ring, an indole ring, a tetrazole ring, the thiazole ring, an oxazole ring and a purine ring. The substituent of these nitrogen-containing heterocycles are not specifically limited, however, preferable are highly hydrophobic groups such as a hydroxyl group, an amino group, a sulfo group, a phosphate group, a carboxyl group, a sulfamoyl group and a hydroxyalkyl group. Among the compounds represented by Formula (A), a compound which exhibits the highest pH value of 9.0 or less measured as an aqueous solution is preferable in view of obtaining an image exhibiting excellent discrimination.

Specific examples of a heterocycle which constitutes a compound represented by Formula (A) according to the present invention will be shown below.

* represents a bond with the other heterocycle.

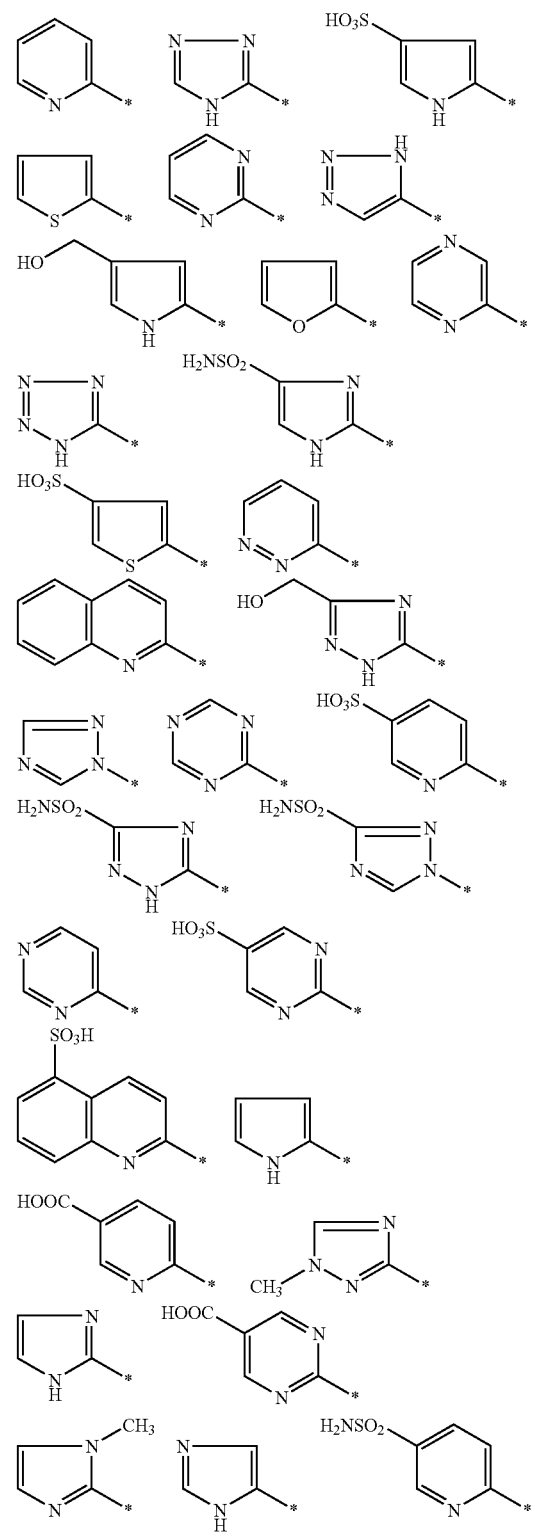

As specific examples of a compound represented by Formula (A), the exemplified compounds 1-1 through 1-40 shown in the aforementioned explanation of Formula [I] may be cited.

Among the compounds, specifically preferable are (1-1), (1-19), (1-22), (1-24), (1-28), (1-32), (1-36), (1-37), (1-38), (1-39) and (1-40).

With respect to Formula (A) according to the present invention, it is preferable that at least one adsorbing group which chemically or physically adsorbs to the electrode is contained, in view of the adhesion with the electrode surface and the durability of the film.

The chemical adsorption according to the present invention is a comparatively strong adsorbed state via a chemical bond with an electrode surface, and the physical adsorption according to the present invention is a comparatively weak adsorbed state via the van der Waals force committed between an electrode surface and adsorbate.

The adsorbing group according to the present invention is preferably a chemically adsorbing group. Examples of a chemically adsorbing group include: —COOH, —P—O(OH)$_2$, —OP=O(OH)$_2$ and —Si(OR)$_3$ (R represents an alkyl group).

As specific examples of a compound represented by Formula (A) having an adsorbing group according to the present invention, the exemplified compounds 1-41 through 1-67 shown in the aforementioned explanation of Formula [I] may be cited.

These compounds can be purchased as commercial products, and also can be synthesized according to the methods which have been reported in abstracts and papers such as Beilsteins Handbuch der Organischen Chemie (Beilsteins Handbuch der Organischen Chemie), Annalen der Chemie (Ann. Chem.), Chemical Abstracts (Chem. Abstracts), Journal of the American chemical Society (J. Am. Chem. Soc.), Monatshefte far Chemie (Monatsch. Chem.), Journal der Russischen Physikalish-Chemischen Gescllschaft (Journal der Russischen Physikalish-Chemischen Gescllschaft).

[Compound Represented by Formula (1) or (2)]

In the display element of the present invention, at least of the compound represented by Formula (1) or (2) is preferably contained together with a metallocene compound and a compound represented by aforementioned Formula (A) between the opposing electrodes.

The compound represented by Formula (1) will be explained, first.

In the above mentioned Formula (1), L represents an oxygen atom or CH$_2$, and R$_1$-R$_4$ each represent a hydrogen atom, an alkyl group, an alkenyl group, an aryl group, a cycloalkyl group, an alkoxy alkyl group or an alkoxy group.

Examples of an alkyl group include: a methyl group, an ethyl group, a propyl group, an isopropyl group, a tert-butyl group, a pentyl group, a hexyl group, an octyl group, a dodecyl group, a tridecyl group, a tetradecyl group and a pentadecyl group; examples of an aryl group include: a phenyl group and a naphthyl group; examples of a cycloalkyl group include: a cyclopentyl group and a cyclohexyl group; examples of an alkoxyalkyl group include: β-methoxyethyl group and γ-methoxypropyl group; and examples of an alkoxy group include: a methoxy group, an ethoxy group, a propyloxy group, a pentyloxy group, a hexyloxy group, an octyloxy group and a dodecyloxy group.

Specific examples of a compound represented by Formula (1) of the present invention will be shown below, however, the present invention is not limited thereto.

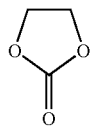

A-1

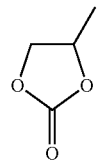

A-2

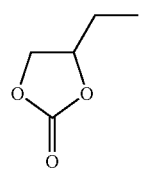

A-3

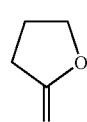

A-4

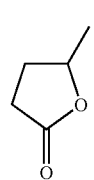

A-5

Subsequently, the compound represented by Formula (2) of the present invention will be explained.

In abovementioned Formula (2), R$_5$, R$_6$ each represent a hydrogen atom, an alkyl group, an alkenyl group, an aryl group, a cycloalkyl group, an alkoxyalkyl group or an alkoxy group.

Examples of an alkyl group include: a methyl group, an ethyl group, a propyl group, an isopropyl group, a tert-butyl group, a pentyl group, a hexyl group, an octyl group, a dodecyl group, a tridecyl group, a tetradecyl group and a pentadecyl group; examples of an aryl group include: a phenyl group and a naphthyl group; examples of a cycloalkyl group include: a cyclopentyl group and a cyclohexyl group; examples of an alkoxyalkyl group include: β-methoxyethyl group and γ-methoxypropyl group; and examples of an alkoxy group include: a methoxy group, an ethoxy group, a propyloxy group, a pentyloxy group, a hexyloxy group, an octyloxy group and a dodecyloxy group.

Specific examples of a compound represented by Formula (2) of the present invention will be shown below, however, the present invention is not limited thereto.

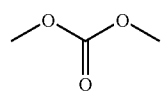

B-1

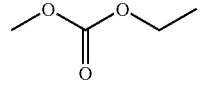

B-2

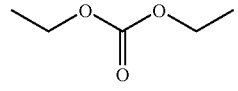

B-3

Among the compounds represented by Formula (1) and Formula (2), exemplified compounds (A-1), (A-2) and (B-3) are specifically preferable.

The compounds represented by Formula (1) and Formula (2) of the present invention belong to one sort of an electrolyte solvent. In the display element of the present invention, another solvent can be used in combination, provided that the object effect of the present invention is not lost. Examples of such a solvent include: tetramethylurea, sulfolane, dimethyl sulfoxide, 1,3-dimethyl-2-imidazolidinone, 2-(N-methyl)-2-pyrrolidinone, hexamethylphosphortriamide, N-methyl propione amide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethylacetate, ethylpropionate, dimethoxyethane, diethoxyfuran, tetrahydrofuran, ethylene glycol, diethylene glycol, triethylene glycol monobutyl ether and water.

It is preferable that, among these solvents, at least one solvent having a freezing point of −2.0° C. or lower and a boiling point of 120° C. or more is incorporated.

Further, listed as solvent employable in the present invention are the compounds shown in: J. A. Riddick, W. B. Bunger, T. KSakano, "Organic Solvents", 4th. ed., John Wiley & Sons (1986), Y. Marcus, "Ion Solvation", John Wiley & Sons (1985), C. Reichardt, "Solvents and Solvent Effects in Chemistry", 2nd ed., VCH (1988) and G. J. Janz, R. P. T. Tomkins, "Non-aqueous Electrolytes Handbook", Vol. 1, Academic Press (1972).

In the present invention, the electrolyte solvent may be a single kind or may be a mixture, however, a mixed solvent containing ethylene carbonate is preferable. The added amount of ethylene carbonate is preferably 10 mass % or more but 90 mass % or less. A mixed electrolyte solvent having a propylene carbonate/ethylene carbonate mass ratio of 7/3 to 3/7 is specifically preferable. When the propylene carbonate mass ratio is larger than 7/3, ionic conductivity of the electrolyte may become lower, resulting in decrease of response rate, while when it is smaller than 3/7, deposition of electrolyte tends to occur at a lower temperature.

[White Scattering Material]

The present invention has a feature that, in view of more enhancing the display contrast and the reflectivity of the white display, a white scattering material is incorporated. The white scattering material may be incorporated by providing a porous white scattering layer.

The porous white scattering layer applicable to the present invention can be formed by coating and drying an aqueous admixture of aqueous polymers, which are substantially insoluble in the electrolyte solvents, and white pigments.

White pigments applicable to the present invention include, for example, titanium dioxide (an anatase type or a rutile type), barium sulfate, calcium carbonate, aluminum oxide, zinc oxide, magnesium oxide, as well as zinc hydroxide, magnesium hydroxide, magnesium phosphate, magnesium hydrogenphosphate, alkaline earth metal salts, talc, kaolin, zeolite, acid clay, glass; and further include organic compounds such as polyethylene, polystyrene, acryl resins, ionomers, ethylene-vinyl acetate copolymer resins, benzoguanamine resins, urea-formalin resins, melamine-formalinresins, and polyamide resins. These materials may be used individually or in the form of a composite mixture, as well as in a state containing, in the particles, voids which alter the refractive index.

In the present invention, among above white particles, titanium dioxide, zinc oxide, or zinc hydroxide is preferably employed. Further, employable are titanium dioxide which has been subjected to a surface treatment employing an inorganic oxide (such as $Al_2O_3$, AlO(OH), and $SiO_2$), or titanium dioxide which has been subjected to a treatment employing an organic compound such as trimethylolethane, triethanolamine acetic acid salts, and trimethylcyclosilane, in addition to the above surface treatment.

Of these white particles, titanium oxide or zinc oxide is more preferably employed in view of prevention of coloring at a higher temperature or an increase of reflectance of elements arising from the reflective index.

In the present invention, aqueous polymers, which are substantially insoluble in electrolyte solvents, include a water-soluble polymer, and a polymer which has been dispersed in a water-based solvent.

Water-soluble compounds include proteins such as gelatin and gelatin derivatives; cellulose derivatives; natural compounds such as polysaccharides including starch, gum arabic, dextran, pullulan, or carrageenan; and synthetic polymer compounds such as polyvinyl alcohol, polyvinylpyrrolidone, acrylamide polymers, and derivatives thereof. Gelatin derivatives include acetylated gelatin and phthalated gelatin. Polyvinyl alcohol derivatives include terminal alkyl group-modified polyvinyl alcohol and terminal mercapto group-modified polyvinyl alcohol. Cellulose derivatives include hydroxyethyl cellulose, hydroxypropyl cellulose, and carboxymethyl cellulose. Further, compounds described in Research Disclosure and on pages 71-75 of JP-A 64-13546, and high water-absorptive polymers such as homopolymers of vinyl monomers having —COOM or —SO3M (M being a hydrogen atom or an alkaline metal) and copolymers of these vinyl monomers with each other and other vinyl monomers (for example, sodium methacrylate, ammonium methacrylate, and potassium acrylate) may be employed, which are described in U.S. Pat. No. 4,960,681 and JP-A 62-245260. These binders may be employed in combination of two or more of them.

In the present invention, gelatin and derivatives thereof, or polyvinyl alcohol and derivatives thereof may be preferably employed.

Polymers dispersed in water based solvents include latexes such as natural rubber latex, styrene butadiene rubber, butadiene rubber, nitrile rubber, chloroprene rubber, and isoprene rubber; and heat curable resins which are prepared by dispersing, in water based solvents, polyisocyanate based, epoxy based, acryl based, silicone based, polyurethane based, urea based, phenol based, formaldehyde based, epoxy-polyamide based, melamine based, or alkyd based resins, or vinyl based resins. Of these polymers, it is preferable to employ water based polyurethane resins described in JP-A No. 10-76621.

The phrase, "being substantially insoluble in electrolyte solvents", as described in the present invention, is defined as a state in which the dissolved amount per kg of the electrolyte solvents is at least 0 g and at most 10 g in the temperature range of −20 to 120° C. It is possible to determine the above dissolved amount employing the commonly known methods, such as a mass measuring method, or a component quantification method utilizing a liquid chromatogram or a gas chromatogram.

In the present invention, a preferred embodiment of the aqueous admixture of a water-based compound and titanium oxide is that the titanium oxide is dispersed in water according to the commonly known dispersion methods. The mixing ratio of a water based compound to titanium oxide is preferably in the range of 1 to 0.01 in terms of volume ratio, and is more preferably in the range of 0.3 to 0.05.

In the present invention, a medium, on which the aqueous admixture of a water-based compound and a white pigment is coated, may be located anywhere as long as it is located on the constitutional components between the counter electrodes of the display element. However, it is preferable that the medium is provided on the surface of at least one of the above counter electrodes. Examples of providing methods to the medium include a coating method; a liquid spraying method; a spraying method via a gas phase such as a method which jets liquid droplets employing vibration of a piezoelectric element such as a piezoelectric system ink-jet head, and a BUBBLE JET (registered trade name) ink-jet head which ejects liquid droplets employing a thermal head utilizing bumping; and a spray method in which liquid is sprayed via air or liquid pressure.

The coating method may be appropriately selected from any of the commonly known coating methods, and examples thereof include an air doctor coater, a blade coater, a rod coater, a knife coater, a squeeze coater, an impregnation coater, a reverse roller coater, a transfer roller coater, a curtain coater, a double roller coater, a slide hopper coater, a gravure coater, a kiss roller coater, a bead coater, a cast coater, a spray coater, a calender coater, and an extrusion coater.

Methods for drying the aqueous admixture of a water based compound and a white pigment provided on the medium are not particularly limited as long as they facilitate water evaporation. Examples thereof include heating employing a heating source, a heating method employing infrared radiation, and a heating method utilizing electromagnetic induction. Further, water evaporation may be performed under reduced pressure.

The term "porous", as described in the present invention, refers to the following state. The porous white scattering materials are formed by applying the above aqueous admixture of the water-based compound and the white pigment to the electrode and subsequently drying the resulting coating, after which, an electrolyte, containing silver or a compound containing silver in its chemical structure, is provided onto the aforesaid scattering material. Then, the resulting scattering material is sandwiched between counter electrodes. The above state is such that when electric potential is applied between the resulting counter electrodes, it is possible to cause silver dissolution and deposition reaction, and refers to a penetration state in which ion species are movable between the electrodes.

In the display element of the present invention, it is preferable that the water based compound in the above-described aqueous admixture is subjected to a hardening reaction employing a hardening agent during coating and drying thereof or after drying of the same.

Examples of hardening agents employed in the present invention include those described in the column 41 of U.S. Pat. Nos. 4,678,739, and 4,791,042, as well as JP-A Nos. 59-116655, 62-245261, 61-18942, 61-249054, 61-245153, and 4-218044. Specific hardening agents include aldehyde based hardening agents (such as formaldehyde), aziridine based hardening agents, epoxy based hardening agents, vinylsulfone based hardening agents (such as N,N'-ethylene-bis(vinylsulfonylacetamido)ethane), N-methylol based hardening agents (such as dimethylolurea), boric acid, metaboric acid, and polymer hardening agents (compounds described in documents such as JP-A No. 62-234157). In case where gelatin is employed as a water-based compound, of the above hardening agents, it is preferable to employ vinylsulfone type hardening agents or chlorotriazine type hardening agents individually or in combination thereof. Further, in case where polyvinyl alcohol is employed, it is preferable to employ boron-containing compounds such as boric acid and metaboric acid.

The amount of these hardening agents employed is 0.001 to 1 g per gram of the water-based compound, and preferably is 0.005 to 0.5 g. In order to increase layer strength, a heat treatment or humidity regulation during the hardening reaction may also be carried out.

[Metal Complex]

The metal complex group according to the present invention is constituted by a silver complex and a metal complex other than a silver complex, both complexes having a common ligand containing a compound represented by Formula (A). Examples of a metal other than silver include Fe, Co and Ni.

The metal complex according to the present invention has a feature that the coloring state changes when silver and a metal other than silver are oxidized or reduced.

Example of a method of fixing the metal complex according to the present invention on an electrode surface include: using a solution formed by dissolving a metal complex in an appropriate solvent, a metal complex is formed on an electrode surface via a self-organizing method, an electrolytic polymerization method, a coating method, an inkjet method or a screen printing method; and, using a solution formed by dissolving a compound represented by Formula (A) according to the present invention in an appropriate solvent, the compound represented by Formula (A) is fixed on an electrode and a cell is fabricated by using the electrode, then the cell is filled with an electrolyte containing a compound containing silver and a metal other than silver, whereby a metal complex of silver and a metal other than silver having the compound represented by Formula (A) fixed on the electrode surface as a ligand is formed on the electrode surface.

In cases in which a display element is dived by passive matrix or by active matrix, it is preferable that colors different with each pixel are displayed by varying the kind of the compound represented by Formula (A) fixed on the electrode while using a common electrolyte.

FIG. 1 is a schematic illustration showing one example of the construction of the display element of the present invention.

In FIG. 1, the upside of Display element 1 is the observation side. In the non-observation side (downside), Metal electrode 3 is formed on Substrate 2 as non-observation side electrode of the opposing electrodes, while on the observation side, Transparent electrode 4 is formed on an opposing surface to Metal electrode 3 on a substrate, and further, on Transparent electrodes 4, Metal complex portions 5 and 6 are formed, each of which is constituted by a complex of silver or a metal other than silver, the complex having a compound represented by Formula (A) as a ligand. In this case, the compound represented by Formula (A) formed in each of Metal complex portions 5 and 6 prepared on two adjoining Transparent electrodes 4 is preferably formed of a different species of the compound.

Between the opposing electrodes, Electrolyte 7 is charged and the peripheral of the element is sealed with Sealing component 8. A white scattering material, a metallocene compound and a silver compound are contained in Electrolyte 7.

The metal complex portion according to the present invention may be added with a suitable binder in view of the strength of the film or enhancement of adhesion with the substrate.

[Nanoporous Electrode]

In the display element of the present invention, it is preferable that the electrode on which the metal complex according to the present invention is applied is a nanoporous electrode having a nanoporous structure.

The formation methods of the nanoporous electrode according to the present invention include: a method in which a layer containing a material constituting the electrode and a solvent is formed via, for example, an inkjet method, a screen printing method and a blade coating method using a dispersion containing the material constituting the electrode, followed by forming a porous layer by heating at a temperature of 120-300° C.; and a method in which, after an electrode layer is formed via, for example, a sputtering method, a CVD method and an atmospheric pressure plasma method, a nanoporous layer is formed by an anode oxidation method or a photoelectrchemical etching method. Also, a nanoporous electrode can be prepared according to the method described in Adv. Mater. 2006, 18, 2980-2983.

The main component of the material which constitutes the nanoporous electrode according to the present invention can be selected from: metals such as Cu, Al, Pt, Ag, Pd, and Au; metal oxides such as ITO, $SnO_2$, $TiO_2$ and ZnO; and carbon electrodes such as carbon nanotube, glassy carbon, diamond like carbon and nitrogen-containing carbon, and is preferably selected from metal oxides, such as ITO, $SnO_2$, $TiO_2$, and ZnO.

As the substrate on which a nanoporous electrode is formed, either glass or a plastic resin may be used. The nanoporous layer according to the present invention may be formed after a conductive layer of metal or metal oxide is formed on glass or plastic resin.

The "porous" as used in the present invention refers to a state which enables that, after an electrolyte is provided on a nanoporous electrode, the nanoporous electrode is sandwiched with another electrode and when a potential difference is applied between the opposing electrodes, an oxidation-reduction reaction of the metal contained in the metal complex portion in the nanoporous electrode or a dissolution-deposition reaction of the metal contained in the electrolyte is conducted, and ion species is mobile in the nanoporous electrode.

The thickness of the nanoporous electrode is preferably 100-1500 nm and more preferably 250-1000 nm.

The adhesion of the metal complex portion and the electrode concerning the present invention can be enhanced by forming the metal complex portion according to the present invention on the nanoporous electrode according to the present invention, whereby the scaling of the metal complex portion under a repeated use can be improved. Specifically, this effect is notable when a metal such as silver or bismuth which exhibits depositing nature with a reduction reaction is used.

[Content Ratio of Halogen Ion and Silver Ion]

In the display element of the present invention, when a molar content of halogen ions or halogen atoms contained in the electrolyte of the display element is represented as [X] (mole/kg) and a total molar content of silver or silver contained in the compound having silver in the chemical structure in the electrolyte is represented as [Ag] (mole/kg), it is preferable that following Condition (1) is satisfied:

$0 \leq [X]/[Ag] \leq 0.01$ (Condition 1)

In the present invention, "a halogen atom" means an iodine atom, a chlorine atom, a bromine atom or a fluorine atom. When the [X]/[Ag] value is larger than 0.01, the reaction of $X^- \rightarrow X_2$ tends to occur while silver is oxidized-reduced. $X_2$ easily dissolves blackened silver by cross-oxidizing the blackened silver, which is one of the factors degrading memory function of the display. Accordingly, the molar content of halogen is preferably as low as possible against the molar content of silver. In the present invention, more preferable is $0 \leq [X]/[Ag] \leq 0.001$. When halogen ions are added, with respect to improving a memory function, the total molar content of each halogen species preferably satisfies [I]<[Br]<[Cl]<[F].

[Electrolyte-Silver Salt]

In the display element of the present invention, silver salts known in the art can be used. Examples of such silver salts include: silver iodide, silver chloride, silver bromide, silver oxide, silver sulfide, silver citrate, silver acetate, silver behenate, p-toluenesulfonic acid silver salt, silver trifluoromethanesulfonate, a silver salt of mercapto compound and a silver complex with an iminodiacetic acid. Of these, preferable is a silver salt which does not contain a nitrogen atom having coordinating property with halogen, carboxylic acid or silver, for example, a silver salt of p-toluenesulfonic acid is preferable.

The content of silver ions in the electrolyte layer of the present invention is preferably 0.2 mole/kg$\leq$[Ag]$\leq$2.0 mole/kg. When the content of silver ions is smaller than 0.2 mole/kg, the silver solution becomes too diluted and the driving rate is reduced, while, when the content of silver ions is larger than 2 mole/kg, the solubility becomes too low, and precipitation tends to occur while stored at a lower temperature, which is disadvantageous.

In the display element of the present invention, various constitution layers can be provided, if necessary, besides the structural element explained as above.

[Porous Electrode Containing Metal Oxide]

The display element of the invention can contain a porous electrode containing a metal oxide.

It has been found in the display element of the invention that when the surface of the electrode opposite a viewer side of the opposed electrodes is protected with a porous electrode containing a metal oxide, oxidation-reduction reaction of silver or a compound containing silver in the chemical structure is carried out on or in the porous electrode. This can increase choices of kinds of an electrode opposite a viewer side, and improve durability of the electrode.

Examples of the metal oxides constituting the porous electrode in the invention include titanium oxide, silicon oxide, zinc oxide, tin oxide, Sn-doped indium oxide (ITO), antimony-doped tin oxide (ATO), fluorine-doped tin oxide (FTO) and aluminum-doped zinc oxide, and a mixture thereof.

The porous electrode can be formed, binding or contacting a plurality of particles of the metal oxide described above. The average particle size of the metal oxide particles is preferably from 5 nm to 10 μm, and more preferably from 20 nm to 1 μm. The specific surface area of the metal oxide particles, based on the simple BET method, is preferably from $1 \times 10^{-3}$ to $1 \times 10^2$ m$^2$/g and more preferably from $1 \times 10^{-2}$ to 10 m$^2$/g. The metal oxide particles may be in any form, such as an amorphous form, needle form or a spherical form.

As a method for forming or binding the metal oxide particles, a sol-gel method or a sintering method can be employed. Examples thereof include, for instance, a method described in 1) Journal of the Ceramic Society of Japan 102, 2, p 200 (1994), 2) Yogyo-kyokai-shi 90 [4] p 157, and 3) J. of Non-Cryst. Solids 82, 400 (1986). There can be also employed a method for preparing a porous electrode which coats, on a substrate, a dispersion solution in which titanium oxide dendrimer particles prepared by a gas phase method are dispersed, followed by drying at 120 to around 150° C. to remove the solvent. The metal oxide particles are preferably in the binding state, and it is preferred that such metal oxide particles have a durability of not less than 0.1 g, and preferably not less than 1 g, the durability measured according to a continuous weight load type surface meter (for example, a scratch meter).

The expression "porous" in the invention refers to the state in which given potential difference between the opposed electrodes so as to cause dissolution and precipitation reaction of silver, ion species produced can move through the porous electrode provided.

[Electron Insulation Layer]

The display element of the invention can comprise an electron insulation layer.

The electron insulation layer applicable to the invention may be a layer which has ion conductivity as well as electron insulation property. Examples thereof include a solid electrolyte film made of a salt or a polymer having a polar group, a quasi-solid electrolyte film which is a porous film with high electron insulation property and has an electrolyte in the voids, a polymer porous film having voids and a porous film made of an inorganic material having low dielectric constant such as a silicon-containing compound.

Formation of a porous film can employ commonly known methods, including a sintering method (or a fusion method, in which polymer microparticles or inorganic particles are partially fused together with a binder and employing pores formed between particles), a subtraction method (in which a layer composed of a solvent-soluble organic or inorganic material and a solvent-insoluble binder is formed and the organic or inorganic material is dissolved by a solvent to form pores), a foaming method of allowing a polymeric material to foam by heating or degassing, a phase conversion method of allowing a mixture of polymers to be phase-separated by using a good solvent and a poor solvent, and a radiation exposure method of exposing to various kinds of radiations to form pores. Specifically, there are cited electron insulation layers described in JP-A Nos. 10-30181 and 2003-107626, JP-A No. 7-95403, and Japanese Patent Nos. 2635715, 2849523, 2987474, 3066426, 3464513, 3483644, 3535942 and 3062203.

(Electrolyte Materials)

In the display element of the present invention, when electrolytes are in liquid form, it is possible to incorporate, in the electrolytes, the following compounds. Listed as potassium compounds are KCl, KI, and KBr; listed as lithium compounds are $LiBF_4$, $LiClO_4$, $LiPF_6$, and $LiCF_3SO_3$; while listed as tetraalkylammonium compounds are tetraethylammonium perchlorate, tetrabutylammonium perchlorate, tetraethylammonium borofluoride, tetrabutylammonium borofluoride, and tetrabutylammonium halide. In addition, preferably used are fused salt electrolyte compositions described in paragraphs [0062]-[0081] of JP-A No. 2003-187881. Further employed are compounds which form oxidation-reduction pairs such as $I^-/I_3^-$, $Br^-/Br_3^-$ and quinone/hydroquinone.

Further, when electrolytes are in solid form, it is possible to incorporate, in the electrolytes, the following compounds which exhibit electronic or ionic conductivity.

Listed are fluorinated vinyl based polymers containing perfluorosulfonic acid; polythiophene; polyaniline; polypyrrole, triphenylamines; polyvinylcarbazoles; polymethylphenylsilanes; calcogenides such as $Cu_2S$, $Ag_2S$, $Cu_2Se$, or $AgCrSe_2$; fluorine compounds such as $CaF_2$, $PbF_2$, $SrF_2$, $LaF_3$, $TlSn_2F_5$, or $CeF_3$; lithium salts such as $Li_2SO_4$ or $Li_4SiO_4$; as well as compounds such as $ZrO_2$, $CaO$, $Cd_2O_3$, $HfO_2$, $Y_2O_3$, $Nb_2O_5$, $WO_3$, $Bi_2O_3$, $AgBr$, $AgI$, $CuCl$, $CuBr$, $CuBr$, $CuI$, $LiI$, $LiBr$, $LiCl$, $LiAlCl_4$, $LiAlF_4$, $AgSBr$, $C_5H_5NHAg_5I_6$, $Rb_4Cu_{16}I_7Cl_{13}$, $Rb_3Cu_7Cl_{10}$, $LiN$, $Li_5NI_2$, or $Li_6NBr_3$.

Further employed as supporting electrolytes may be electrolytes in gel form. When electrolytes are nonaqueous, it is possible to employ oil gelling agents described in paragraphs [0057]-[0059] of JP-A No. 11-185836.

[Thickening Agents Added to the Electrolyte]

In the display element of the present invention, it is possible to use thickening agents in the electrolyte layer. Examples include gelatin, gum Arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly (acrylic acid), poly (methylmethacrylic acid), poly(vinyl chloride), poly(methacrylic acid), copoly(styrene-maleic anhydride), copoly(styrene-acrylonitrile), copoly(styrene-butadiene), poly(vinyl acetals) (for example, poly(vinyl formal), poly(vinyl butyral)), poly(vinyl esters), poly(urethanes), phenoxy resins, poly(vinylidene chloride), poly(epoxides), poly(carbonates), poly(vinyl acetate), cellulose esters, poly(amides), as well as polyvinyl butyral, cellulose acetate, cellulose acetate butyrate, polyester, polycarbonate, polyacrylic acid, and polyurethane as a transparent hydrophobic binder.

These thickening agents may be employed in combinations of at least two types. Further listed are the compounds described on pages 71-75 of JP-A No. 64-13546. Of these, in view of compatibility with various types of additives and enhancement of dispersion stability of white particles, preferably employed compounds are polyvinyl alcohols, polyvinylpyrrolidones, hydroxypropyl celluloses, and polyalkylene glycols.

(Other Additives)

In the display element of the present invention, listed as constitution layers include ancillary layers such as a protective layer, a filter layer, an antihalation layer, a cross-over light cutting layer, or a backing layer. If necessary, incorporated in these ancillary layers may be various chemical sensitizers, noble metal sensitizers, photosensitive dyes, supersensitizers, couplers, high boiling point solvents, antifoggants, stabilizers, development inhibitors, bleach accelerators, fixing accelerators, color mixing inhibitors, formalin scavengers, toners, hardeners, surface active agents, thickening agents, plasticizers, lubricants, DV absorbers, antirradiation dyes, filter light absorbing dyes, mildewcides, polymer latexes, heavy metals, antistatic agents, and matting agents.

The additives listed above are more detailed in Research Disclosure (hereinafter referred to as RD) Volume 176 Item/17643 (December 1978), RD Volume 184 Item/18431 (August 1979), DR Volume 187 Item/18716 (November 1979), and RD Volume 308 Item/308119 (December 1989).

Types of compounds and their citations in these three Research Disclosures are listed below.

| Additives | RD 17643 | | RD 18716 | | RD 308119 | |
|---|---|---|---|---|---|---|
| | Page | Section | Page | Section | Page | Section |
| Chemical Sensitizers | 23 | III | 648 | right top | 96 | III |
| Sensitizing Dyes | 23 | IV | 648-649 | | 996-8 | IV |
| Desensitizing Dyes | 23 | IV | | | 998 | IV |
| Dyes | 25-26 | VIII | 649-650 | | 1003 | VIII |
| Development Accelerators | 29 | XXI | 648 | right top | | |
| Antifoggant Stabilizer | 24 | IV | 649 | right top | 1006-7 | VI |
| Optical Brightening Agents | 24 | V | | | 998 | V |
| Hardeners | 26 | X | 651 | left | 1004-5 | X |

-continued

| | RD 17643 | | RD 18716 | | RD 308119 | |
|---|---|---|---|---|---|---|
| Additives | Page | Section | Page | Section | Page | Section |
| Surfactants | 26-7 | XI | 650 | right | 1005-6 | XI |
| Antistatic Agents | 27 | XII | 650 | right | 1006-7 | XIII |
| Plasticizers | 27 | XII | 650 | right | 1006 | XII |
| Lubricants | 27 | XII | | | | |
| Matting Agents | 28 | XVI | 650 | right | 1008-9 | XVI |
| Binders | 26 | XXII | | | 1003-4 | IX |
| Supports | 28 | XVII | | | 1009 | XVII |

[Constitution of Full Color Element]

The layer constitution between the opposed electrodes of the Display element of the present invention will further be explained.

The display device of the present invention is characterized in that substantially a multi-color display of three or more colors including a black display, a white display and a color display other than the black display is carried out by a driving operation using the opposed electrodes.

It is preferable that the color display other than the black display is carried out by arranging display areas displaying substantially different colors in a plane, whereby a color display and white and black displays are carried out. The method to arrange display areas displaying substantially different colors in a plane is preferably carried out by supporting electrochromic compounds having different colors in a porous metal oxide layer. Specifically, the support of the electrochromic compounds in the porous metal oxide layer is carried out by separately painting the electrochromic compounds using an inkjet method.

Namely, examples of a method to carry out a full color display of the present invention include: a method to divide the space between a pair of opposed electrode by a dividing wall and to seal electrolyte liquids exhibiting different colors (electrolyte liquids containing different kinds of electrochromic compounds) in each dividing wall, whereby arranged in a plane; and a method to separately paint different polypyridine compounds on a metal oxide porous layer to support, without using a dividing wall. The methods to separately paint include a printing method and an inkjet method, however, an inkjet method is preferably employed.

[Substrates]

Examples of a substrate employable in the display element of the present invention include synthetic plastic films, for example: polyolefins such as polyethylene or polypropylene, polycarbonates, cellulose acetate, polyethylene terephthalate, polyethylene dinaphthalene dicarboxylate, polyethyrene naphthalates, polyvinyl chloride, polyimide, polyvinyl acetals, and polystyrene. In addition, preferred are syndioctatic structured polystyrenes. These are prepared employing the methods described, for example, in each of JP-A Nos. 62-117708, 1-46912, and 1-178505. Further listed examples include metal substrates including stainless steel, paper supports such as baryta paper or resin coated paper, supports including the above plastic film having thereon a reflection layer, and those which are described in JP-A No. 62-253195 (pages 29-31) as a support. Further preferably employed are those described on page 28 of RD No. 17643, from the right column to the left column on page 648 of RD No. 18716, and on page 879 of RD No. 307105. As described in U.S. Pat. No. 4,142,735, these supports may be subjected to a thermal treatment at a temperature lower than Tg so that core-set curl is decreased. Further, the surface of these supports may be subjected to a surface treatment with the aim of enhancement of adhesion of the support to other constituting layers. In the present invention, employed as surface treatments may be a glow discharge treatment, an ultraviolet radiation irradiation treatment, a corona treatment and a flame treatment. Further employed may be supports described on pages 44-149 of Kochi Gijutsu (Prior Art Technology) No. 5 (published by AZTEC Corp., dated Mar. 22, 1991). Further listed are those described on page 1009 of RD No. 308119, as well as in the item "Supports" on page 108 of Product Licensing Index Volume 92. Other than the above, employed may be glass substrates as well as epoxy resins kneaded with glass powder.

[Electrodes]

In the display element of the present invention, it is preferable that at least one of the opposed electrodes is a metal electrode. Employed as metal electrodes may be metals such as platinum, gold, silver, copper, aluminum, zinc, nickel, titanium, or bismuth, as well as alloys thereof, which are known in the art. Preferred metals employed in the metal electrodes are those which exhibit a work function near the oxidation-reduction potential of silver in electrolytes. Of these, a silver electrode or an electrode composed of silver in an amount of at least 80 percent is advantageous to maintain a reduced state of silver, and in addition, results in anti-staining of electrodes. Employed as methods for preparing electrodes may be conventional ones such as a evaporating method, a printing method, an ink-jet method, a spin coating method, or a CVD method.

Further, it is preferable that in the display element of the present invention, at least one of the opposed electrodes is a transparent electrode. Transparent electrodes are not particularly limited as long as they are transparent and electrically conductive. Examples include indium tin oxide (ITO), indium zinc oxide (IZO), tin oxide, fluorine-containing tin oxide (FTO), indium oxide, zinc oxide, platinum, gold, silver rhodium, copper, chromium, carbon, aluminum, silicon, amorphous silicon, and BSO (bismuth silicon oxide). In order to form electrodes as described above, for example, an ITO layer may be subjected to mask evaporation on a substrate employing a sputtering method, or after forming an ITO layer on the entire surface, patterning may be performed employing a photolithographic method. The surface resistance value is preferably 100 Ω/sq or less, but is more preferably 10 Ω/sq or less. The thickness of the transparent electrodes is not particularly limited but is commonly 0.1-20 μm.

[Other Components Constituting the Display Element]

If desired, employed in the display element of the present invention may be sealing agents, column-structured materials, and spacer particles.

Sealing agents are those to seal materials so that they do not leak out. Employed as sealing agents may be heat curing, light curing, moisture curing, and anaerobic curing type resins such as epoxy resins, urethane resins, acryl resins, vinyl acetate resins, enethiol resins, silicone resins, or modified polymer resins.

Column-structured materials provides strong self-supporting (strength) between substrates. For example, listed may be a cylindrical form, a quadrangular form, an elliptic cylindrical form, and a trapezoidal form which are arranged at definite intervals in a specified pattern such as a lattice. Further, employed may be stripe-shaped ones arranged at definite intervals. It is preferable that the column-structured materials are not randomly arranged but arranged at an equal distance, arranged so that the interval gradually varies, or a predetermined pattern is repeated at a definite cycle so that the distance between substrates is appropriately maintained and image display is not hindered. When the column-structured materials are such that the ratio of the area occupied by the display region of a display element is 1-40%, sufficient strength for commercial viability is obtained as a display element.

In order to maintain a uniform gap between paired substrates, provided may be spacers between them. As such spacers, exemplified may be spheres composed of resins or inorganic oxides. Further, suitably employed are adhesion spacers the surface of which is coated with thermoplastic resins. In order to maintain the uniform gap between substrates, provided may only be column-structured materials. However, both spacers and column-structure materials may be provided. In place of the column-structured materials, only spacers may be employed as a space-maintaining member. The diameter of spacers, when a column-structured material is formed, is at most its height, but is preferably equal to the height. When the column-structured material is not formed, the diameter of spacers corresponds to the distance of the cell gap.

[Screen Printing]

In the present invention, it is possible to form sealing agents, column-structured materials, and electrode patterns, employing a screen printing method. In screen printing methods, a screen on which predetermined patterns are formed is covered on the electrode surface, and printing materials (compositions to form column-structured materials such as light-curing resins) are placed on the screen. Subsequently a squeegee is moved at predetermined pressure, angle and rate. By such action, the printing materials are transferred onto the above substrate via the pattern of the screen. Then, the transferred materials are thermally cured and dried. When column-structured materials are formed employing the screen printing method, resinous materials are not limited to light-curing resins, but also employed, for example, may be heat curable resins such as epoxy resins or acryl resins, as well as thermoplastic resins. Listed as thermoplastic resins are polyvinyl chloride resins, polyvinylidene chloride resins, polyvinyl acetate resins, polymethacrylic acid ester resins, polyacrylic acid ester resins, polystyrene resins, polyamide resins, polyethylene resins, polypropylene resins, fluorocarbon resins, polyurethane resins, polyacrylonitrile resins, polyvinyl ether resins, polyvinylketone resins, polyether resins, polyvinylpyrrolidone resins, saturated polyester resins, polycarbonate resins, and chlorinated polyether resins. It is preferable that resinous materials are employed in the form of a paste while dissolved in suitable solvents.

As noted above, after forming the column-structured materials on the substrate, spacers are provided on at least one side of the substrate, and paired substrates are placed so that the electrode forming surfaces face each other, whereby a vacant cell is formed. By heating the paired facing substrates, they are allowed to adhere to each other under application of pressure from both sides, whereby a display cell is obtained. Preparation of a display element may be performed by injecting an electrolyte composition between the substrates, employing a vacuum injection method. Alternatively, during adhesion of substrates, an electrolyte composition may be dripped on the surface of one of the substrates and then liquid crystal composition may be sealed simultaneously when the substrates are allowed to adhere to each other.

[Driving Method of Display Element]

In the display element of the present invention, the preferable driving operation include depositing blackened silver by applying a voltage larger than the deposition overvoltage, followed by continuing the deposition of blackened silver by applying a voltage lower than the deposition overvoltage. By conducting the above driving operation, the writing energy and the load to the driving circuit can be reduced, and the writing rate can be increased. Generally, in the field of electrochemistry, it is well known that there exists an overvoltage in the electrode reaction. For example, a detailed description on the overvoltage is found page 121 of "Denshi-ido no kagaku-Denkikagaku Nyuumon" (1996, Asakura Publishing Co., Ltd.). In the display element of the present invention, the reaction between the electrode and silver contained in the electrolyte is considered to be an electrode reaction, and it is easily understood that an overvoltage exists when the dissolution and deposition of silver are carried out. The extent of an overvoltage depends on the exchange current density. Accordingly, it can be deduced that the surface of blackened silver has less excess electrical energy and injection of electrons is more easily carried out, because deposition of blackened silver can be continued at a lower applying voltage than the deposition overvoltage of silver.

The driving method of a transparent state and a colored state of the display element of the present invention is preferably determined based on the oxidation-reduction voltage or the deposition overvoltage of a metal complex.

For example, in the case of a display element having, between opposed electrodes, a silver complex and an iron complex each having a compound represented by Formula (A) as a ligand, a colored state is displayed when no voltage is applied, a white state is displayed on an oxidizing side and a black state is displayed on a reducing side. An example of a driving method in this case is that: a white state is displayed by applying a voltage higher than the oxidation-reduction potential of an iron complex to oxidize the iron complex; the display is returned to a colored state other than a black state by applying a voltage between the oxidation-reduction potential of the iron complex and the oxidation-reduction potential of the silver complex to reduce the iron complex; a black state is displayed by applying a voltage lower than the deposition overvoltage of the silver complex to deposit silver; and the colored state is erased by applying a voltage lower than the oxidation-reduction potential of the iron complex to dissolve the deposited silver.

The driving operation of the display element of the present invention may be via a simple matrix drive or an active matrix drive. "Simple matrix drive", as described in the present invention, refers to the driving method in which a plurality of positive electrode lines and a plurality of negative electrode lines are placed face to face so that the positive electrode lines and the negative electrode lines cross in right angles, and electric current is sequentially applied to these positive electrode lines and negative electrode lines. By employing the simple matrix driving, it is possible to simplify the circuit structure and the driving IC, resulting in advantages such as lower production cost. Active matrix drive refers to a system in which scanning lines, data lines, and current feeding lines are formed in a checkered pattern and driving is performed by TFT circuits arranged in each of the squares of the checkered pattern. Since switching is performed for each pixel, advantages result in gradation as well as memory function. For example, a circuit disclosed in FIG. 5 of JP-A No. 2004-29327 is usable.

[Application to Commercial Product]

It is possible to apply the display element of the present invention to electronic book related field, ID card related fields, public information related fields, transportation related fields, broadcasting related fields, account settling fields, and distribution and logistics related fields. Specific examples include door keys, student identification cards, corporate member identification cards, various club membership cards, convenience store cards, department store cards, vending machine cards, gas station cards, subway and railroad cards, bus cards, cash cards, credit cards, highway cards, driver licenses, hospital medical examination cards, health insurance cards, residents' basic registers, passports and electronic books.

EXAMPLES

The present invention will now be described with reference to examples, however, the present invention is not limited thereto. In the following examples, "parts" or "%" mean "mass parts" and "mass %", respectively, unless otherwise specified.

Example 1

[Preparation of Display Element 1]
(Preparation of Electrolyte Liquid 1)
Added to 2.5 g of dimethyl sulfoxide were 0.15 g of sodium iodide, 0.1 g of silver iodide, 0.05 g of polyethylene glycol (average molecular weight: 500,000) and 0.01 g of Exemplified compound (1-68), which were completely dissolved, to obtain Electrolyte liquid 1.
(Preparation of Electrode 1)
Films of ITO (Indium Tin Oxide) of 130 μm width with 145 μm interval were formed on a 1.5 mm thick 2 cm×4 cm glass substrate according to the method known in the prior art, whereby Electrode 1 which was a transparent electrode was obtained.
(Preparation of Electrode 2)
Silver-palladium electrodes of 0.8 μm thick and 130 μm width with 145 μm interval were formed on a 1.5 mm thick 2 cm×4 cm glass substrate according to the method known in the prior art, whereby Electrode 2 was obtained.
(Preparation of Electrode 3)
On Electrode 2 of which peripheral part was edged with an olefin sealant containing 10% by volume of spherical glass beads having an average particles diameter of 40 μm, 100 μm of a mixed liquid was applied, the mixed liquid being obtained by dispersing 20% by mass of titanium oxide using a ultrasonic disperser in an isopropanol solution containing 2% by mass of polyvinyl alcohol (average polymerization degree of 20% and saponification degree of 87%). Thereafter, the product was dried at 15° C. for 30 minutes to evaporate the solvent and then dried at 45° C. for 1 hour, whereby Electrode 3 was obtained.
(Preparation of Display Element)
Electrodes 1 and 3 were faced each other so that the striped electrodes of Electrodes 1 and 3 were perpendicularly crossed and heat pressed to form an empty cell. The empty cell was charged with Electrolyte liquid 1 under vacuum, followed by sealing the charge port with an UV curable epoxy resin, whereby Display element 1 was prepared.
[Evaluation of Display Element 1]
Both electrodes of Display element 1 were connected to both terminals of a constant voltage power source to apply ±1.5 V. The coloring state of the display element was observed and the reflectance of the display element, when D65 light source of a spectrophotometer CM-3700d produced by Konica Minolta Sending Inc. was used, was measured. Display element 1 exhibited a yellow display (the maximum absorption wavelength of 442 nm) originated from a reduced state of Exemplified compound (1-68) and from an oxidized state of silver when no voltage was applied, a white display originated from an oxidized state of Exemplified compound (1-68: yellow) and from an oxidized state of silver when +1.5 V was applied and a black display originated from a reduced state of silver when −1.5 V was applied to the transparent electrode. Thus, it was confirmed that multi color display containing three colors was possible using only one type of electrolyte between a pair of electrodes. It was also confirmed that a multi color display containing three colors was possible when silver iodide in Electrolyte liquid 1 was replaced with bismuth chloride.

Example 2

[Preparation of Display Element 2]
Electrolyte liquid 2 was prepared in the same manner as the preparation of Electrolyte liquid 1 use in Display element 1 described in Example 1 except that 0.3 g of titanium oxide was added in the electrolyte. Electrolyte liquids 3 and 4 were prepared in the same manner as the preparation of Electrolyte liquid 2 except that Exemplified compound (1-68: yellow) was changed to equimolar Exemplified compounds (1-70: magenta) and Exemplified compound (1-147: cyan), respectively.
The peripheral part of Electrode 2 described in Example 1 was edged with an olefin sealant containing 10% by volume of spherical glass beads having an average particles diameter of 20 μm, and further a dividing wall having windows of 100 μm square was formed using photolithography at pixels where Electrode 2 crossed with Electrode 1, whereby Electrode 4 was formed. Into the windows, Electrolyte liquids 2, 3, 4 were poured using a dispenser so as to form a Bayer arrangement. Further, Electrode 1 was pasted so that the striped electrodes perpendicularly crossed with each other, whereby Display element 2 was prepared.
[Evaluation of Display Element]
Using a passive matrix driving circuit in which the voltage of each pixel of Display element 2 was changed, color hue of Display element 4 was observed. It was confirmed that each color of white, black, yellow, magenta, cyan, blue, green and red could be displayed. Further, the reflectances at a wavelength of 550 nm were 65% when white was displayed and 3% when black was displayed. Thus, it was confirmed that the display element of the present invention enables a color display with a high reflectance of white and a high white-black contrast using a simple constitution of the members.

Example 3

Inks 1-3 were prepared by dissolving 0.3 g each of Exemplified compound (1-73: yellow), Exemplified compound (1-74: magenta) and Exemplified compound (1-152: cyan), respectively, in 2.5 g of ethanol.
Added to 2.5 g of dimethyl sulfoxide were 0.1 g of silver iodide, 0.15 g of sodium iodide and polyethylene glycol (average molecular weight: 500), whereby Electrolyte liquid 5 was prepared.
Films of ITO of 130 μm width with 145 μm interval were formed on a 1.5 mm thick 2 cm×4 cm glass substrate according to the method known in the prior art and 10 g/m² of titanium oxide (average particle diameter of 25 nm) was applied on it, followed by drying at 350° C. for 1 hour, whereby Electrode 5 applied with a porous metal oxide layer was obtained. Electrode 6 was prepared by separately applying Inks 1-3 on Electrode 5 so as to form a Bayer arrangement using a commercially available inkjet coating apparatus. Electrodes 6 and 1 were faced each other so that the striped electrodes of Electrodes 6 and 1 were perpendicularly crossed and heat pressed to form an empty cell. The empty cell was charged with Electrolyte liquid 5 under vacuum, followed by sealing the charge port with an UV curable epoxy resin, whereby Display element 3 was prepared.

Using a passive matrix driving circuit in which the voltage of each pixel of Display element 3 was changed, color hue of Display element 3 was observed. It was confirmed that each color of white, black, yellow, magenta, cyan, blue, green and red could be displayed. Further, the reflectances at a wavelength of 550 nm were 66% when white was displayed and 3% when black was displayed. Thus, it was confirmed that the display element of the present invention enables a color display with a high reflectance of white and a high white-black contrast using a simple constitution of the members.

Example 4

Figure 2:
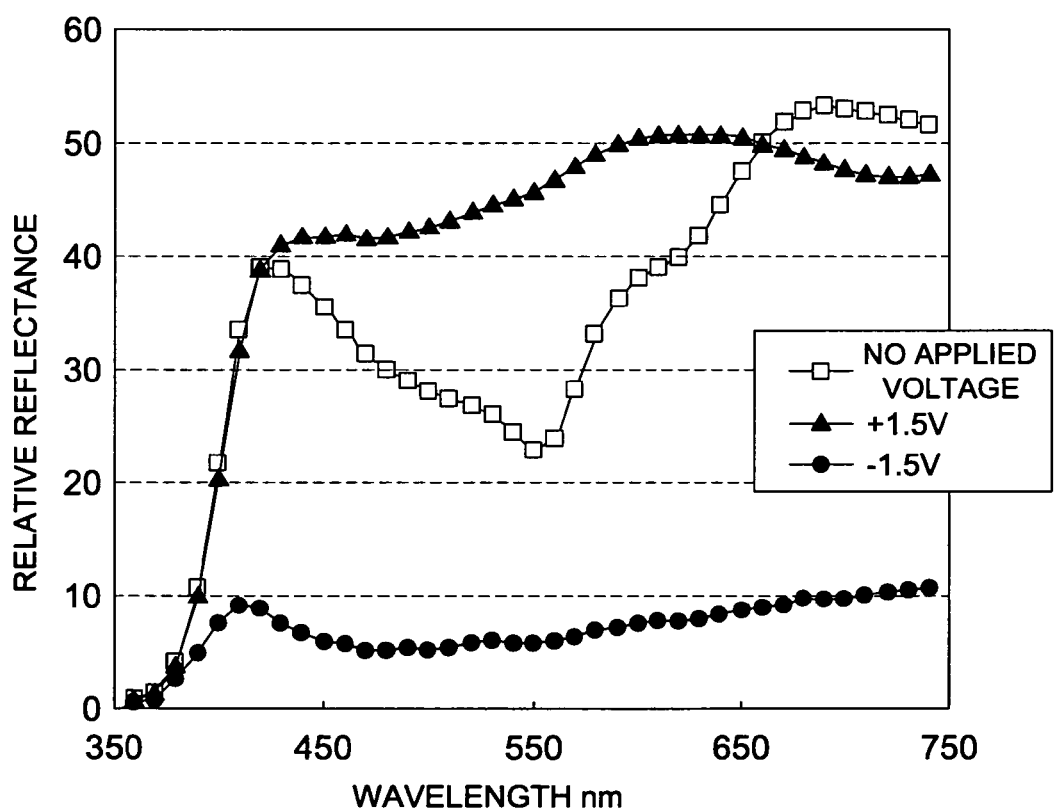
FIG. 2 is a graphic chart showing the results of reflectance measurement of the display element used in an Example.

[Preparation of Display Element 4]
(Preparation of Electrolyte Liquid 6)
Added to 2.5 g of propylene carbonate were 0.1 g of silver p-toluenesulfonate, 0.005 g of ferrocene, 0.3 g of Exemplified compound (1-24), which were completely dissolved, to obtain Electrolyte liquid 6.
(Preparation of Display Element)
Abovementioned Electrodes 3 and 1 were faced each other so that the striped electrodes of Electrodes 3 and 1 were perpendicularly crossed and heat pressed to form an empty cell. The empty cell was charged with Electrolyte liquid 6 under vacuum, followed by sealing the charge port with an UV curable epoxy resin, whereby Display element 4 was prepared.
(Evaluation of Display Element)
Both electrodes of Display element 4 were connected to both terminals of a constant voltage power source to apply ±1.5 V. The coloring state of the display element was observed and the reflectance of the display element, when D65 light source of a spectrophotometer CM-3700d produced by Konica Minolta Sending Inc. was used, was measured. In FIG. 2, results of reflectance measurement were shown.

As shown in FIG. 2, Display element 4 exhibited magenta color display when no voltage was applied (shown as □ in FIG. 2), white display when −1.5 V was applied to the transparent electrode (shown as ▲ in FIG. 2) and black display when +1.5 V was applied to the transparent electrode (shown as ● in FIG. 2). Thus, it was found that multi color display containing three colors was possible using only one type of electrolyte between a pair of electrodes.
[Preparation of Display Elements 5 and 6]
Display elements 5 and 6 were prepared in the same manner as the preparation of Display element 4 except that Exemplified compound (1-24) was changed to equimolar Exemplified compounds (1-1) and (1-36), respectively.

As the results of the evaluation carried out for Display elements 5 and 6 in the same manner as for Display element 4, the maximum absorption wavelengths while the display elements were colored were 470 nm for Display element 5 and 625 nm for Display element 6. It was found that, both of Display elements 5 and 6 exhibited a white display at −1.5 V and a black display at +1.5 V, thus multi color display was attained.

Example 5

[Preparation of Display Element 7]
Electrolyte liquid 7 was prepared in the same manner as for Electrolyte liquid 6 except that 0.7 g of titanium oxide was added to Electrolyte liquid 6 used in the preparation of Display element 4 described in Example 4. Electrolyte liquids 8 and 9 were prepared in the same manner as for Electrolyte liquid 7 except that Exemplified compound (1-24) was changed to equimolar Exemplified compounds (1-1) and (1-36), respectively.

The peripheral part of Electrode 2 described in Example 4 was edged with an olefin sealant containing 10% by volume of spherical glass beads having an average particles diameter of 20 μm, and further a dividing wall having windows of 100 μm square was formed using photolithography at pixels where Electrode 2 crossed with Electrode 1, whereby Electrode 4 was formed. Into the windows, Electrolyte liquids 7, 8, 9 were poured using a dispenser so as to form a Bayer arrangement. Further, Electrode 1 was pasted so that the striped electrodes perpendicularly crossed with each other, whereby Display element 7 was prepared.
(Evaluation of Display Element)
Using a passive matrix driving circuit in which the voltage of each pixel of Display element 7 was changed, color hue of Display element 4 was observed. It was confirmed that each color of white, black, yellow, magenta, cyan, blue, green and red could be displayed.
[Preparation of Display Element 8]
Inks 4-6 were prepared by dissolving 0.3 g each of Exemplified compounds (1-19), (1-31) and (1-32), respectively, in 2.5 g of ethanol. Added to 2.5 g of propylene carbonate were 0.1 g of silver p-toluenesulfonate, 0.005 g of ferrocene, whereby Electrolyte liquid 10 was prepared.

Films of ITO of 130 μm width with 145 μm interval were formed on a 1.5 mm thick 2 cm×4 cm glass substrate according to the method known in the prior art and 10 g/m$^2$ of titanium oxide (average particle diameter of 25 nm) was applied on it, followed by drying at 350° C. for 1 hour, whereby Electrode 5 applied with a porous metal oxide layer was obtained. Electrode 6 was prepared by separately applying Inks 4-6 on Electrode 5 so as to form a Bayer arrangement using a commercially available inkjet coating apparatus. Electrodes 6 and 1 were faced each other so that the striped electrodes of Electrodes 6 and 1 were perpendicularly crossed and heat pressed to form an empty cell. The empty cell was charged with Electrolyte liquid 10 under vacuum, followed by sealing the charge port with an UV curable epoxy resin, whereby Display element 8 was prepared.
(Evaluation of Display Element)
Using a passive matrix driving circuit in which the voltage of each pixel of Display element 8 was changed, color hue of Display element 5 was observed. It was confirmed that each color of white, black, yellow, magenta, cyan, blue, green and red could be displayed.

Example 6

<<Preparation of Display Element>>
[Preparation of Display Element 11]
(Preparation of Electrolyte Liquid 11)
Added to 2.5 g of propylene carbonate were 10 mg of ferrocene, 50 mg of Exemplified compound (1-24) and 50 mg of tetrabutylammomonium perchlorate. Into the obtained liquid 1.5 g of titanium dioxide CR-90 produced by ISHIHARA SANGYO KAISHA LTD. (average particle diameter of 0.28 μm) was mixed to obtain Electrolyte liquid 11.
(Preparation of Electrode)
(Preparation of Electrode 11)
Films of ITO (Indium Tin Oxide) of 130 μm width with 145 μm interval were formed on a 1.5 mm thick 2 cm×4 cm glass substrate according to the method known in the prior art, whereby a transparent electrode (Electrode 11) was obtained.

(Preparation of Electrode 12)

Nickel electrodes of 0.1 µm thick and 130 µm width with 145 µm interval were formed on a 1.5 mm thick 2 cm×4 cm glass substrate according to the method known in the prior art and dipped in a displacement gold plating bath, whereby a gold-nickel electrode (Electrode 12) in which 0.05 µm depth from the electrode surface was replaced with gold was obtained.

(Preparation of Display Element)

After peripheral part of Electrode 12 was edged with an olefin sealant containing 10% by volume of spherical glass beads having an average particles diameter of 40 µm, whereby Electrode 3 was obtained. Electrodes 11 and 12 were faced each other so that the striped electrodes of Electrodes 11 and 13 were perpendicularly crossed and heat pressed to form an empty cell. The empty cell was charged with Electrolyte liquid 11 under vacuum, followed by sealing the charge port with an UV curable epoxy resin, whereby Display element 11 was prepared.

[Preparation of Display Element 12]
(Preparation of Electrolyte Liquid 12)

Added to 2.5 g of propylene carbonate were 10 mg of decamethylferrocene, 50 mg of Exemplified compound (1-24), 100 mg of silver p-toluenesulfonate and 50 mg of tetrabutylammomonium perchlorate. Into the obtained liquid 1.5 g of titanium dioxide CR-90 produced by ISHIHARA SANGYO KAISHA LTD. was mixed to obtain Electrolyte liquid 12.

(Preparation of Display Element)

Display element 12 was prepared in the same manner as for Display element 11 except that Electrolyte liquid 11 was replaced with Electrolyte liquid 12.

[Preparation of Display Element 13]
(Preparation of Electrolyte Liquid 13)

Added to 2.5 g of propylene carbonate were 10 mg of ferrocene, 50 mg of Exemplified compound (1-24), equimolar of terpyridine and iron chloride, and 50 mg of tetrabutylammomonium perchlorate. Into the obtained liquid 1.5 g of titanium dioxide CR-90 produced by ISHIHARA SANGYO KAISHA LTD. was mixed to obtain Electrolyte liquid 13.

(Preparation of Display Element)

Display element 13 was prepared in the same manner as for Display element 11 except that Electrolyte liquid 11 was replaced with Electrolyte liquid 13.

[Preparation of Display Element 11-1]
(Preparation of Electrolyte Liquid 14)

Added to 2.5 g of propylene carbonate were 10 mg of ferrocene, 50 mg of Exemplified compound (1-24), 100 mg of silver p-toluenesulfonic acid silver salt and 50 mg of tetrabutylammomonium perchlorate. Into the obtained liquid 1.5 g of titanium dioxide CR-90 produced by ISHIHARA SANGYO KAISHA LTD. was mixed to obtain Electrolyte liquid 14.

(Preparation of Display Element)

Display element 11-1 was prepared in the same manner as for Display element 11 except that Electrolyte liquid 11 was replaced with Electrolyte liquid 14.

[Preparation of Display Elements 11-2 Through 11-5]

Display elements 11-2 through 11-5 were prepared in the same manner as for Display element 11 except that the compounds constituting the electrolyte are changed as shown in TABLE 1.

[Preparation of Display Element 11-6]
(Preparation of Electrolyte Liquid 19)

Added to 2.5 g of propylene carbonate were 10 mg of ferrocene, 100 mg of silver p-toluenesulfonic acid silver salt and 50 mg of tetrabutylammomonium perchlorate. Into the obtained liquid, 1.5 g of titanium dioxide CR-90 produced by ISHIHARA SANGYO KAISHA LTD. was mixed to obtain Electrolyte liquid 19.

(Preparation of Electrode)
<Preparation of Electrode 13>

On Electrode 1, a liquid prepared by dissolving Compound (1-47) in acetonitrile so that the content is 0.3 by mass was spin coated at 50000 rpm for 60 seconds to form a layer of 50 nm thick containing Compound (1-47).

(Preparation of Display Element)

Display element 11-6 was prepared in the same manner as for Display element 11 except that Electrolyte liquid 11 was replaced with Electrolyte liquid 19 and Electrode 11 was replaced with Electrode 13.

[Preparation of Display Element 11-7]

Display element 11-7 was prepared in the same manner as for Display element 11-6 except that Electrode 13 was replaced with Electrode 14.

<Preparation of Electrode 14>

On Electrode 1, a liquid prepared by dissolving Compound (1-42) in acetonitrile so that the content is 0.3% by mass was spin coated at 50000 rpm for 60 seconds to form a layer of 50 nm thick containing Compound (1-47).

<<Measurement of Oxidation-Reduction Potential of Metallocene Compound>>

Metallocene compound was added in acetonitrile so that the content is 10 mmol/L and further tetrabutylammonium perchlorate was added so that the content was 100 mmol/L. The oxidation-reduction potential of the obtained liquid was measured via CV technique using Electrochemical Analyzer 630B produced by BAB Inc., under conditions: initial voltage of 0 V; highest voltage of +1 V; lowest voltage of −1 V; and scan rate of 100 mV/sec.

<<Measurement of Deposition Overvoltage of Silver in Electrolyte Liquid>>

Figure 3:
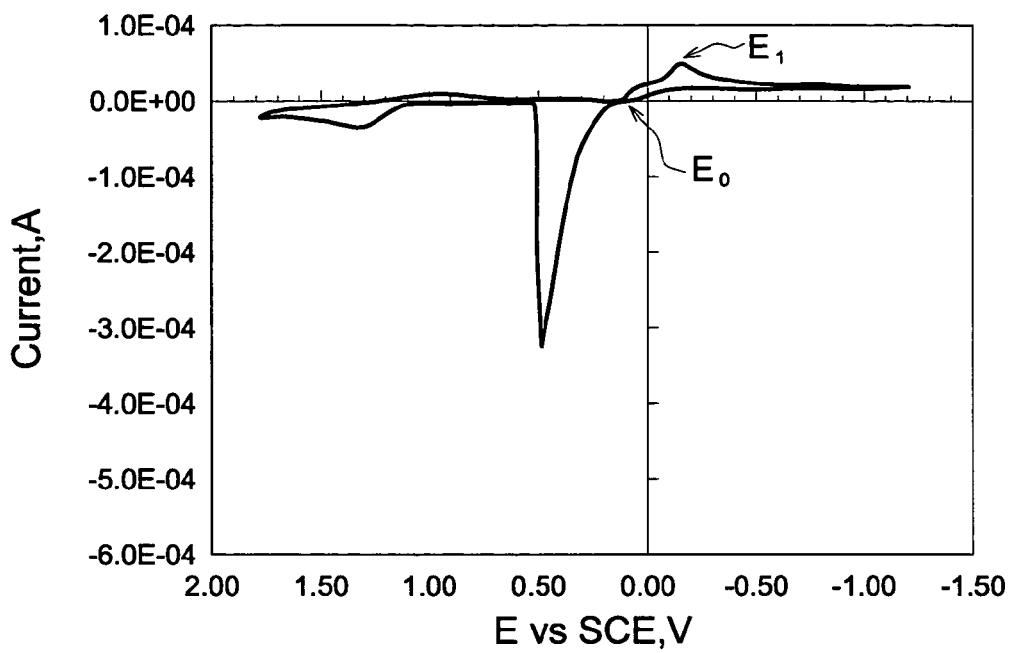
FIG. 3 is a graphic chart showing one example of a cyclic voltammogram.

The transparent electrode of each of Display elements 11 to 13 and 11-1 to 11-7 was connected with a working electrode and the metal electrode of each display element was connected with a reference electrode and a counter electrode. A cyclic voltammogram of each display element was obtained by employing CV technique using Electrochemical Analyzer 630B produced by BAS Inc., under conditions: initial voltage of 0 V; highest voltage of +1.5 V; lowest voltage of −1.5 V; direction of initial scan: negative direction; and scan rate of 100 mV/sec. When the rising edge voltage on the cathode side of the obtained cyclic voltammogram was designated as $E_0$ and the peak voltage was designated as $E_1$, $(E_0+E_1)/2$ was designated as the deposition overvoltage of the present invention. FIG. 3 shows an example of a cyclic voltammogram.

<<Evaluation of Display Element>>

Both electrodes of each display element were connected to a constant-voltage power supply, and the colors of the display element at no applied voltage, and voltages (−1.5 V, +1.5 V) as shown in TABLE 1 were visually observed.

Also, the color unevenness of the display element at a voltage of +1.5 V was visually observed after voltages of −1.5 V and +1.5 V, each for 1 second, were repeatedly applied 1000 times to each display element. The color unevenness was evaluated in 7 steps, namely, no unevenness (7), very slight unevenness (6), slight unevenness (5), unevenness (4), medium unevenness (3), severe unevenness (2) and severest unevenness (1), which were used as indexes of the stability after repeated use. In view of practical use, at least the level of (3) is desirable.

The results obtained as above were listed in TABLE 1.

TABLE 1

| Display element no. | Transparent electrode | | | | Electrolyte | | | | |
|---|---|---|---|---|---|---|---|---|---|
| | No. | Material | Shape | Formula (1) compound | No. | Metallocene | Formula (1) compound | Silver compound | Other |
| 11 | 1 | ITO | Flat | — | 1 | Ferrocene | (1-24) | — | — |
| 12 | 1 | ITO | Flat | — | 2 | Ferrocene | (1-24) | *3 | — |
| 13 | 1 | ITO | Flat | — | 3 | *1 | (1-24) | — | Iron chloride |
| 11-1 | 1 | ITO | Flat | — | 4 | Ferrocene | (1-24) | *3 | — |
| 11-2 | 1 | ITO | Flat | — | 5 | Ferrocene | (1-24) | *3 | — |
| 11-3 | 1 | ITO | Flat | — | 6 | *2 | (1-1) | *3 | — |
| 11-4 | 1 | ITO | Flat | — | 7 | Ferrocene | (1-47) | *3 | — |
| 11-5 | 1 | ITO | Flat | — | 8 | Ferrocene | (1-42) | *3 | — |
| 11-6 | 3 | ITO | Flat | (1-47) | 9 | Ferrocene | — | *3 | — |
| 11-7 | 4 | ITO | Flat | (1-42) | 9 | Ferrocene | — | *3 | — |

| Display element no. | Oxidation-reduction potential (V) VS. SCE Metallocene | Deposition overvoltage VS. SCE | Evaluation result | | | Repeat stability Visual observation | Remarks |
|---|---|---|---|---|---|---|---|
| | | | No applied voltage | Display color −1.5 (V) | +1.5 (V) | | |
| 11 | +0.38 | — | White | White | White | — | Comparative |
| 12 | −0.13 | −0.03 | Black | Black | Black | — | Comparative |
| 13 | +0.38 | — | Red | White | White | 1 | Inventive |
| 11-1 | +0.38 | −0.03 | Red | White | Black | 3 | Inventive |
| 11-2 | +0.26 | −0.03 | Red | White | Black | 3 | Inventive |
| 11-3 | +0.38 | −0.08 | Magenta | White | Black | 3 | Inventive |
| 11-4 | +0.38 | −0.03 | Red | White | Black | 6 | Inventive |
| 11-5 | +0.38 | −0.06 | Red | White | Black | 6 | Inventive |
| 11-6 | +0.38 | −0.03 | Red | White | Black | 6 | Inventive |
| 11-7 | +0.38 | −0.08 | Magenta | White | Black | 6 | Inventive |

*1: Decamethylferrocene,
*2: Dimethylferrocene,
*3: Tocic acid silver salt

As is clear from the results described in TABLE 1, Display elements 11-1 through 11-7 of the present invention each enabled a multi color display of three colors including a display of white state, and further the unevenness in display after repeated use was largely reduced.
Specifically, Display elements 11-4 through 11-7 each showed notably reduced unevenness in display after repeated use.

Example 7

<<Preparation of Electrode>>
(Preparation of Electrode 15)
After a paste containing titanium dioxide having an average diameter of 50 nm was coated with screen printing on Electrode 1, the electrode was heated at 150° C. for 30 minutes to remove the solvent of the paste, and further heated at 500° C. for 60 minutes, whereby a porous titanium dioxide electrode (Electrode 15) having a thickness of 500 nm was obtained.
(Preparation of Electrode 16)
On the abovementioned electrode 13, a liquid in which terpyridine was dissolved in acetonitrile to have a content of 0.3 t by mass was ejected via an inkjet method to fix the terpyridine in the porous titanium dioxide electrode by impregnating, whereby Electrode 16 was obtained.
(Preparation of Electrode 17)
On the abovementioned electrode 13, a liquid in which bipyridyl was dissolved in acetonitrile to have a content of 0.3% by mass was ejected via an inkjet method to fix the bipyridyl in the porous titanium dioxide electrode by impregnating, whereby Electrode 17 was obtained.
<<Preparation of Display Element>>
[Preparation of Display Elements 14 to 16 and 12-1 to 12-5]
Display elements 14 to 16 and 12-1 to 12-5 were prepared in the same manner as for Display elements 11 to 13 and 11-1 to 11-5 described in Example 6, respectively except that Electrode 11 was replaced with Electrode 15.
[Preparation of Display Elements 12-6 and 12-7]
Display elements 12-6 and 12-7 were prepared in the same manner as for Display element 11-6 except that Electrode 13 was replaced with Electrodes 16 and 17, respectively.
<<Evaluation of Display Element>>
The colored state and unevenness in display after repeated use of each of Display elements 14 to 16 and 12-1 to 12-7 were evaluated in the same manner as described in Example 6. Obtained results were shown in TABLE 2.

TABLE 2

| Display element no. | Transparent electrode | | | | Electrolyte | | | | |
|---|---|---|---|---|---|---|---|---|---|
| | No. | Material | Shape | Formula (1) compound | No. | Metallocene | Formula (1) compound | Silver compound | Other |
| 14 | 5 | *A | Porous | — | 1 | Ferrocene | (1-24) | — | — |
| 15 | 5 | *A | Porous | — | 2 | Ferrocene | (1-24) | *3 | — |

TABLE 2-continued

| Display element no. | | | | | | | | | |
|---|---|---|---|---|---|---|---|---|---|
| 16 | 5 | *A | Porous | — | 3 | *1 | (1-24) | — | Iron chloride |
| 12-1 | 5 | *A | Porous | — | 4 | Ferrocene | (1-24) | *3 | — |
| 12-2 | 5 | *A | Porous | — | 5 | Ferrocene | (1-24) | *3 | — |
| 12-3 | 5 | *A | Porous | — | 6 | *2 | (1-1) | *3 | — |
| 12-4 | 5 | *A | Porous | — | 7 | Ferrocene | (1-47) | *3 | — |
| 12-5 | 5 | *A | Porous | — | 8 | Ferrocene | (1-42) | *3 | — |
| 12-6 | 6 | *A | Porous | (1-47) | 9 | Ferrocene | — | *3 | — |
| 12-7 | 7 | *A | Porous | (1-42) | 9 | Ferrocene | — | *3 | — |

| Display element no. | Oxidation-reduction potential (V) VS. SCE Metallocene | Deposition overvoltage VS. SCE | Display color | | | Repeat stability ΔE | Remarks |
|---|---|---|---|---|---|---|---|
| | | | No applied voltage | −1.5 (V) | +1.5 (V) | | |
| 14 | +0.38 | — | White | White | White | — | Comparative |
| 15 | −0.13 | −0.03 | Black | Black | Black | — | Comparative |
| 16 | +0.38 | — | Red | White | White | 2 | Inventive |
| 12-1 | +0.38 | −0.03 | Red | White | Black | 4 | Inventive |
| 12-2 | +0.26 | −0.03 | Red | White | Black | 4 | Inventive |
| 12-3 | +0.38 | −0.08 | Magenta | White | Black | 4 | Inventive |
| 12-4 | +0.38 | −0.03 | Red | White | Black | 7 | Inventive |
| 12-5 | +0.38 | −0.08 | Red | White | Black | 7 | Inventive |
| 12-6 | +0.38 | −0.03 | Magenta | White | Black | 7 | Inventive |
| 12-7 | +0.38 | −0.06 | Red | White | Black | 7 | Inventive |

*A: ITO/TiO$_2$,
*1: Decamethylferrocene,
*2: Dimethylferrocene,
*3: Tocic acid silver salt As is clear from the results described in TABLE 2, Display elements 12-1 through 12-7 of the present invention each enabled a multi color display of three colors including a display of white state, and further the unevenness in display after repeated use was largely reduced.
Specifically, Display elements 12-4 through 12-7 each showed notably reduced unevenness in display after repeated use.

Example 8

<<Preparation of Electrode>>
(Preparation of Electrode 18)

Figure 4A:
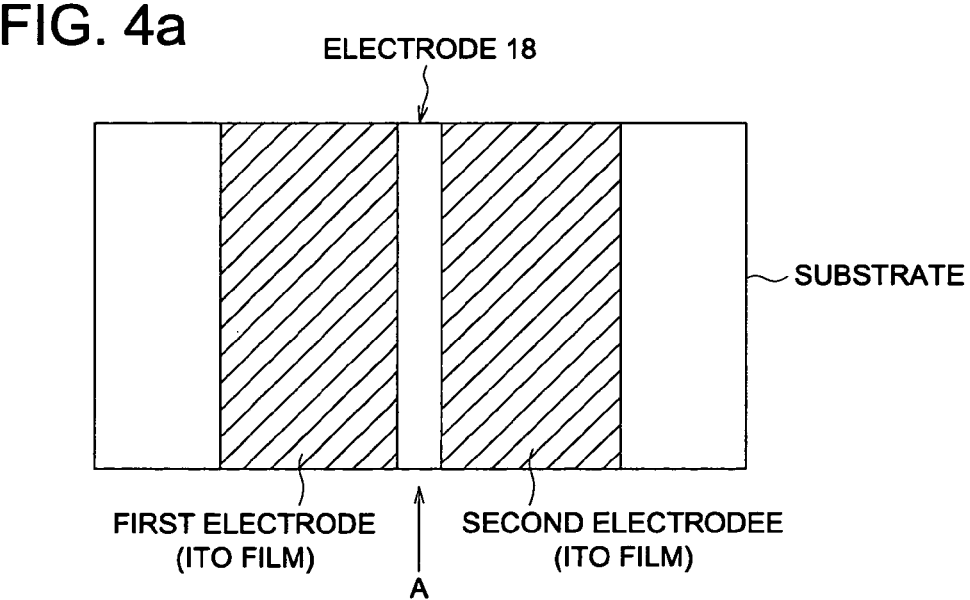
FIGS. 4a and 4b are schematic illustrations showing one example of the construction of Electrode 18 used in an Example.
Figure 4B:
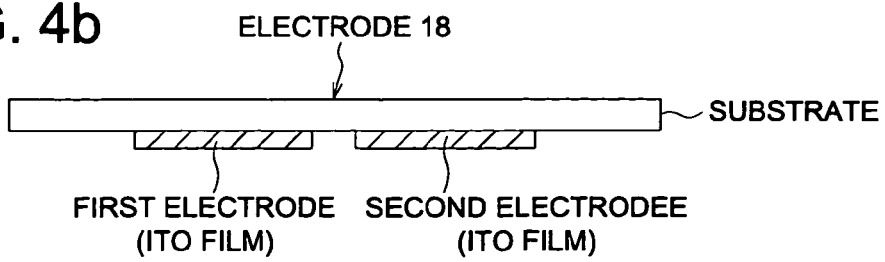

Two films of ITO (Indium Tin Oxide) of the size of 2 cm×1 cm were formed with 0.1 mm interval on a 1.5 mm thick 2 cm×4 cm glass substrate according to the method known in the prior art, whereby Electrode 8 which was a transparent electrode was obtained. The two ITO films formed on Electrode 8 were designated as First electrode and Second electrode, respectively. In FIG. 4, a schematic illustration of the constitution of Electrode 8 was shown.
(Preparation of Electrode 19)

Figure 5:
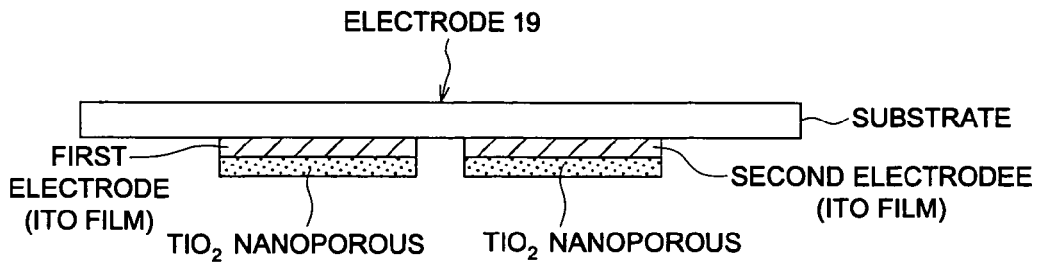
FIG. 5 is a schematic illustration showing the construction of Electrode 19 having a nanoporous layer used in an Example.

After a paste containing titanium dioxide having an average diameter of 50 nm was coated with screen printing on the ITO films of Electrode 18, the electrode was heated at 150° C. for 30 minutes to remove the solvent of the paste, and further heated at 500° C. for 60 minutes, whereby a porous titanium dioxide electrode (Electrode 19) having a thickness of 500 nm was obtained. In FIG. 5, a schematic illustration of the constitution of Electrode 9 was shown.
(Preparation of Electrode 20)

Figure 6:
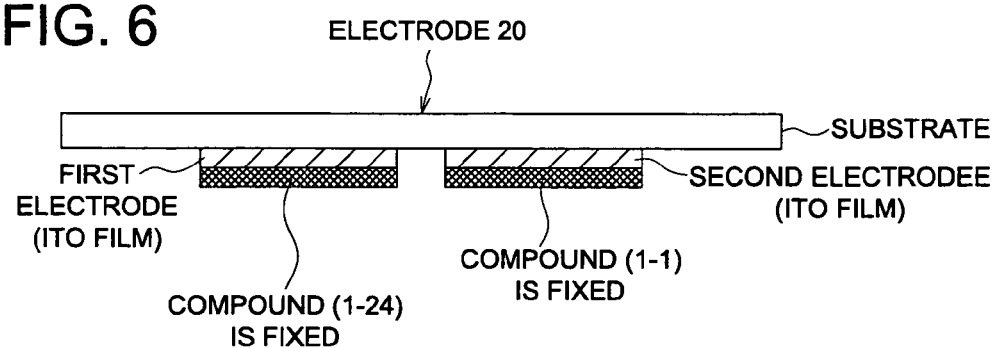
FIG. 6 is a schematic illustration showing the construction of Electrode 200 having a nanoporous layer used in an Example.

Compound (1-24) was fixed on First electrode of Electrode 19, and Compound (1-1) was fixed on Second electrode of Electrode 19. The method of fixing was as follows: the liquids in which Compound (1-24) and (1-1), respectively, were dissolve in acetonitrile were respectively ejected using an inkjet ejecting apparatus, followed by evaporating acetonitrile at 120° C. In FIG. 6, a schematic illustration of the constitution of Electrode 10 was shown.
(Preparation of Electrode 21)

Figure 7A:
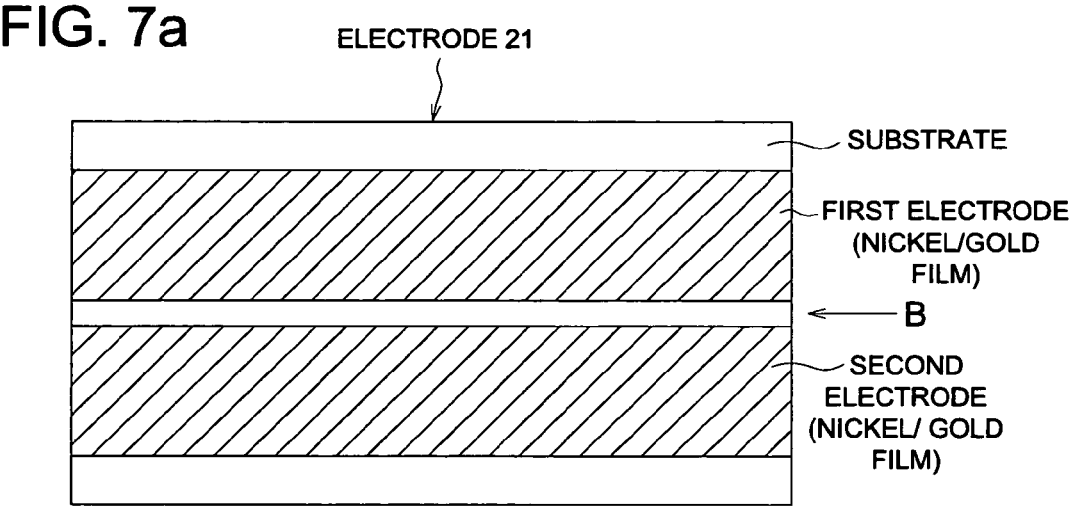
FIGS. 7a and 7b are schematic illustrations showing the construction of Electrode 21 in the non-observation side, used in an Example.
Figure 7B:
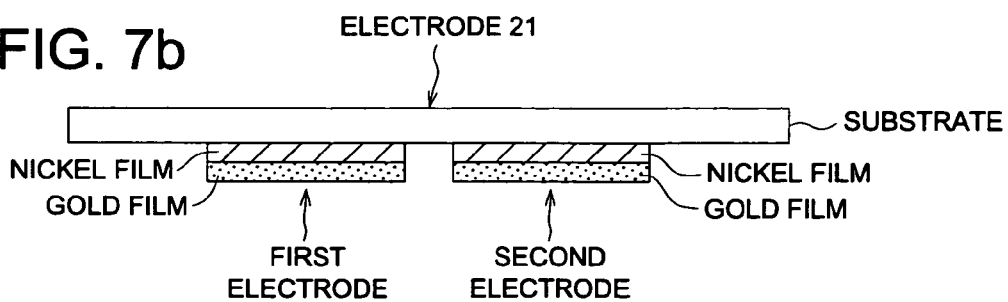

Two films of nickel of the size of 2 cm×1 cm and the thickness of 0.1 mm were formed with 1 mm interval on a 1.5 mm thick 2 cm×4 cm glass substrate according to the method known in the prior art, and dipped in a displacement gold plating bath, whereby a gold-nickel electrode (Electrode 21) in which 0.05 μm depth from the electrode surface was replaced with gold was obtained. In FIGS. 7a and 7b, schematic illustrations of the constitution of Electrode 21 were shown.
<<Preparation of Display Element>>
[Preparation of Display Element 17]
(Preparation of Electrolyte Liquid 20)

Added to 2.5 g of propylene carbonate were 50 mg of terpyridine iron, 50 mg of bipyridyl iron and 50 mg of tetrabutylammomonium perchlorate. Into the obtained liquid, 1.5 g of titanium dioxide CR-90 produced by ISHIHARA SANGYO KAISHA LTD. was mixed to obtain Electrolyte liquid 20.
(Preparation of Display Element)

After peripheral part of Electrode 21 was edged with an olefin sealant containing 106 by volume of spherical glass beads having an average particles diameter of 40 μm. Electrodes 18 and 21 were faced each other so that the striped electrodes of Electrodes 18 and 21 were perpendicularly crossed and heat pressed to form an empty cell. The empty cell was charged with Electrolyte liquid 20 under vacuum, followed by sealing the charge port with an UV curable epoxy resin, whereby Display element 17 was prepared.

[Preparation of Display Element 18]
(Preparation of Electrolyte Liquid 21)

Added to 2.5 g of propylene carbonate were 10 mg of decamethylferrocene, 100 mg of p-toluenesulfonic acid silver salt and 50 mg of tetrabutylammomonium perchlorate. Into the obtained liquid, 1.5 g of titanium dioxide CR-90 produced by ISHIHARA SANGYO KAISHA LTD. was mixed to obtain Electrolyte liquid 21.

(Preparation of Display Element)

After peripheral part of Electrode 21 was edged with an olefin sealant containing 10% by volume of spherical glass beads having an average particles diameter of 40 μm. Electrodes 20 and 21 were faced each other so that the striped electrodes of Electrodes 20 and 21 were perpendicularly crossed and heat pressed to form an empty cell. The empty cell was charged with Electrolyte liquid 21 under vacuum, followed by sealing the charge port with an UV curable epoxy resin, whereby Display element 18 was prepared.

[Preparation of Display Element 13-1]
(Preparation of Electrolyte Liquid 22)

Added to 2.5 g of propylene carbonate were 10 mg of ferrocene, 100 mg of p-toluenesulfonic acid silver salt and 50 mg of tetrabutylammomonium perchlorate. Into the obtained liquid, 1.5 g of titanium dioxide CR-90 produced by ISHIHARA SANGYO KAISHA LTD. was mixed to obtain Electrolyte liquid 21.

(Preparation of Display Element)

Display element 13-1 was prepared in the same manner as for Display element 18 except that Electrolyte liquid 21 was replaced with Electrolyte liquid 22.

[Preparation of Display Elements 13-2 to 13-6]
(Preparation of Electrodes 22 to 26)

Electrodes 22 to 26 were prepared in the same manner as for Electrode 20 except that the compound fixed on First electrode was replaced with the compounds listed in TABLE 3, respectively.

(Preparation of Display Element)

Display elements 13-2 to 13-6 were prepared in the same manner as for Display element 13-1 except that Electrode 20 was replaced with Electrodes 22 to 26, respectively.

<<Evaluation of Display Element>>

The colored state of each of Display elements 17 to 18 and 13-1 to 13-6 was evaluated in the same as described in Example 6. Obtained results were listed in TABLE 3.

TABLE 3

| Display element no. | Formula (1) compound on transparent electrode | | Electrolyte | | | Other | |
|---|---|---|---|---|---|---|---|
| | No. | First electrode | Second electrode | No. | Metallocene | Silver compound | Terpyridine iron | Bipyridyl iron |
| 17 | 8 | — | — | 10 | — | — | Present | Present |
| 18 | 10 | (1-47) | (1-42) | 11 | Decamethylferrocene | Tocic acid silver salt | None | None |
| 13-1 | 10 | (1-47) | (1-42) | 12 | Ferrocene | Tocic acid silver salt | None | None |
| 13-2 | 12 | (1-52) | (1-42) | 12 | Ferrocene | Tocic acid silver salt | None | None |
| 13-3 | 13 | (1-54) | (1-42) | 12 | Ferrocene | Tocic acid silver salt | None | None |
| 13-4 | 14 | (1-57) | (1-42) | 12 | Ferrocene | Tocic acid silver salt | None | None |
| 13-5 | 15 | (1-58) | (1-42) | 12 | Ferrocene | Tocic acid silver salt | None | None |
| 13-6 | 16 | (1-60) | (1-42) | 12 | Ferrocene | Tocic acid silver salt | None | None |

| Display element no. | First electrode side (V) | | Second electrode side (V) | | Evaluation result | | |
|---|---|---|---|---|---|---|---|
| | Oxidation-reduction potential VS. SCE | Deposition overvoltage VS. SCE | Oxidation-reduction potential VS. SCE | Deposition overvoltage VS. SCE | Display color | | |
| | | | | | First electrode +1.5 v | Second electrode −1.5 v | Remarks |
| 17 | — | — | — | — | Red | Red | Comparative |
| 18 | −0.13 | −0.03 | −0.13 | −0.08 | Black | Black | Comparative |
| 13-1 | +0.38 | −0.03 | +0.38 | −0.08 | Red | Magenta | Inventive |
| 13-2 | +0.38 | −0.16 | +0.38 | −0.08 | Red | Magenta | Inventive |
| 13-3 | +0.38 | −0.08 | +0.38 | −0.08 | Red | Magenta | Inventive |
| 13-4 | +0.38 | −0.03 | +0.38 | −0.08 | Red | Magenta | Inventive |
| 13-5 | +0.38 | −0.16 | +0.38 | −0.08 | Red | Magenta | Inventive |
| 13-6 | +0.38 | −0.08 | +0.38 | −0.08 | Red | Magenta | Inventive |

As is clear from the results shown in TABLE 3, Display elements 13-1 to 13-6 of the present invention enabled display of colors of different color hues by independently driving First electrode and Second electrode.

Example 9

When Display elements were prepared in the same manner as for Display elements 13-1 to 13-6, respectively, except that the titanium dioxide was replaced with zinc oxide having an average particle diameter of 0.3 μm, and evaluated in the same manner as described in Example 6, the effect of the present invention was confirmed in the same way as above.

Example 10

When Display elements were prepared in the same manner as for Display elements 13-1 to 13-6, respectively, except that the transparent electrodes were changed from ITO to FTO (Tin oxide doped with fluorine), and evaluated in the same manner as described in Example 6, the effect of the present invention was confirmed in the same way as above.

Example 11

A gel electrolyte was prepared by mixing 20% by mass based on the mass of the solvent used in each of Display elements 13-1 to 13-6 of butyral resin #3000-1 produced by DENKI KAGAKU KOGYO KABUSHIKI KAISHA into the electrolyte. When Display elements 13-1 to 13-6 each were charged with the gel electrolyte, and evaluated in the same manner as described in Example 6, the effect of the present invention was confirmed in the same way as above.

What is claimed is:

1. A display element comprising opposed electrodes having therebetween an electrolyte, an electrochromic compound, a metal salt compound and a white scattering material, wherein the display element carries out a multi-color display of three or more colors by carrying out a black display, a white display and a color display other than the black display, wherein the multi-color display is carried out by using:

(1) a color variation caused by an oxidation-reduction reaction of the electrochromic compound; and (2) a color variation caused by deposition of a metal element contained in the metal salt compound onto at least one of the opposed electrodes or dissolution of the metal from the at least one of the opposed electrodes, the color variations of (1) and (2) being carried out by a driving operation using the opposed electrodes.

2. The display element of claim 1, wherein the metal salt compound is a silver salt compound.

3. The display element of claim 1, wherein the electrochromic compound is a metal complex coordinated with at least one organic ligand having a carbon-nitrogen double bond as a substructure.

4. The display element of claim 3, wherein the organic ligand is a compound represented by Formula [I]:

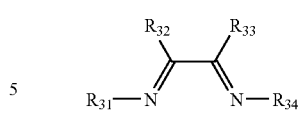

Formula [I]

wherein $R_{31}$, $R_{32}$, $R_{33}$ and $R_{34}$ each independently represent a hydrogen atom, an amino group, a hydroxy group, a mercapto group, an alkoxy group, an alkyl group, an alkenyl group, an alkynyl group, an aryl group or a heterocycle group, these substituents may further have a substituent; $R_{31}$ and $R_{32}$, $R_{32}$ and $R_{33}$, and $R_{33}$ and $R_{34}$ each may be connected with each other to form an aromatic or non-aromatic ring structure; and the ring structure may have a substituent at an arbitrary (Original)position of the ring structure.

5. The display element of claim 1, wherein at least one compound represented by Formula (1) or (2), a metallocene compound and a compound represented by Formula (A) are comprised between the opposed electrodes:

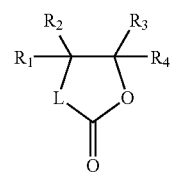

Formula (1)

wherein L represents an oxygen atom or $CH_2$, $R_1$-$R_4$ each represent a hydrogen atom, an alkyl group, an alkenyl group, an aryl group, a cycloalkyl group, an alkoxyalkyl group or an alkoxy group,

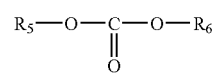

Formula (2)

wherein $R_5$ and $R_6$ each represent a hydrogen atom, an alkyl group, an alkenyl group, an aryl group, a cycloalkyl group, an alkoxyalkyl group or an alkoxy group,

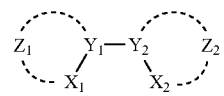

Formula (A)

wherein $X_1$ and $X_2$ each represent —$NR_1$—, —S—, or —O—; $R_1$ represents a hydrogen atom or a bond for forming a double bond with a neighboring atom; $Y_1$ and $Y_2$ each represent $CR_2$ or N; $R_2$ represents a hydrogen atom or a bond for forming a double bond with a neighboring atom; $Z_1$ represents a group of atoms necessary to form a heterocycle with $X_1$, $Y_1$; $Z_2$ represents a group of atoms necessary to form a heterocycle with $X_2$, $Y_2$; a heterocycle formed by $Z_1$, $X_1$ and $Y_1$ and a heterocycle formed by $Z_2$, $X_2$ and $Y_2$ each may have a substituent or may form the condensed ring.

6. The display element of claim 1 comprising opposed electrodes having therebetween a silver complex and a metal complex other than a silver complex, both complexes having a compound represented by Formula (A) as a common ligand, a white scattering material and an electrolyte comprising a metallocene compound, wherein
an oxidation-reduction potential of the metallocene compound is higher than a deposition overvoltage of silver.

7. The display element of claim 5, wherein a metal species forming the metallocene compound is at least one selected from Fe, Co and Ni.

8. The display element of claim 5, wherein the electrochromic compound is prepared by reacting an organic ligand. with the metallocene compound.

9. The display element of claim 1, wherein the electrochromic compound has an adsorbing group which chemically or physically adsorbs to a surface of at least one of the opposed electrodes.

10. The display element of claim 9, wherein the adsorbing group is at least one selected from —COOH, —P—O(OH)$_2$, —OP=O(OH)$_2$ and —Si(OR)$_3$ , R representing an alkyl group.

11. The display element of claim 1, the display element carrying out the color display, the white display and the black display, wherein the color display other than the black display is carried out by arranging display areas displaying different colors in a plane.

12. The display element of claim 1, wherein the electrochromic compound is supported in a porous metal oxide layer.

13. The display element of claim 12, wherein the electrochromic compound is supported in the porous metal oxide layer by painting separately using an inkjet method.

14. The display element of claim 1, wherein the display element satisfies the following condition:

0≦[X]/[Ag]0.01 wherein:
[Ag] (mole/kg) represents a molar content of a compound containing silver; and
[X] (mole/kg) represents a total molar content of halogen atoms contained in halogen ions or halogen molecules.

15. The display element of claim 1, wherein a distance between the opposed electrodes is 20 μm or more but 100 μm or less.

16. The display element of claim 1, wherein the black display is carried out by a cathodic reaction.

17. The display element of claim 1, wherein an average diameter of the white scattering material is 200 nm or more.

18. The display element of claim 1, wherein the white scattering material comprises at least one selected from TiO$_2$, ZnO and Al$_2$O$_3$.

19. The display element of claim 1, wherein the electrolyte comprises a cyclic ester compound.

20. The display element of claim 1, wherein the electrolyte is selected from a solid electrolyte, a gel electrolyte and a high viscosity electrolyte.

21. The display element of claim 1, wherein an opposed electrode used on an observation side is at least one selected from indium oxide doped with Sn (ITO, In$_2$O$_3$: Sn), Tin oxide doped with F (FTO, SO$_2$: F) and ZnO.

22. A method of driving the display element of claim 1 comprising the steps of:
displaying a white state on an oxidizing side;
displaying a black state on a reducing side; and
displaying a colored state other than the black state by applying no voltage,
wherein a colored state formed by an anodic reaction is erased at a voltage lower than a deposition overvoltage of a cathodic reaction product.

23. A method of driving the display element of claim 1 comprising the steps of:
displaying a white state on an oxidizing side;
displaying a black state on a reducing side; and
displaying a colored state other than the black state by applying no voltage,
wherein a colored state formed by a cathodic reaction is erased at a voltage equal to or lower than a oxidation voltage of an anodic reaction product.

* * * * *